United States Patent
Rice et al.

(10) Patent No.: US 11,382,261 B2
(45) Date of Patent: Jul. 12, 2022

(54) SYSTEM AND METHOD FOR STACKING CONTAINERS

(71) Applicant: AMVAC CHEMICAL CORPORATION, Newport Beach, CA (US)

(72) Inventors: Richard L. Rice, Collierville, TN (US); Keith Woodruff, Mountainside, NJ (US); Brian Kaltner, Fairfield, NJ (US)

(73) Assignee: AMVAC CHEMICAL CORPORATION, Newport Beach, CA (US)

( * ) Notice: Subject to any disclaimer, the term of this patent is extended or adjusted under 35 U.S.C. 154(b) by 0 days.

(21) Appl. No.: 17/353,970

(22) Filed: Jun. 22, 2021

(65) Prior Publication Data

US 2021/0307242 A1    Oct. 7, 2021

Related U.S. Application Data

(63) Continuation-in-part of application No. 16/872,379, filed on May 12, 2020, now Pat. No. 11,039,569, (Continued)

(51) Int. Cl.
*A01C 15/00* (2006.01)
*B67D 3/00* (2006.01)
(Continued)

(52) U.S. Cl.
CPC .......... *A01C 15/005* (2013.01); *A01C 23/008* (2013.01); *A01M 7/0085* (2013.01); (Continued)

(58) Field of Classification Search
CPC .. A01C 15/005; A01C 23/008; A01M 7/0085; A01M 9/0084; B67D 3/0032; B67D 3/0061
See application file for complete search history.

(56) References Cited

U.S. PATENT DOCUMENTS 113,591 A     4/1871  Spooner
317,988 A     5/1885  Gibbon
(Continued)

FOREIGN PATENT DOCUMENTS

EP    2636294 A1    9/2013
GB    2346308 A     8/2000
(Continued)

OTHER PUBLICATIONS

Screenshot from http://www.amvacsmartbox.com/AboutSmartBoxiAboulSmartBoxilabid/l03/Default.aspx ,downloaded on Sep. 23, 2016 (1 Page).
(Continued)

*Primary Examiner* — Jeremy Carroll
(74) *Attorney, Agent, or Firm* — Lawrence N. Ginsberg

(57) ABSTRACT

A method and system for stacking containers each container of a type having a front face having a truncated trapezoidal shape, a rear face having a truncated trapezoidal shape, a top base, a bottom base, a first vertical side adjacent to the top base, a second vertical side adjacent to the top base, a first sloped side between the first vertical side and the bottom base, a second sloped side between the second vertical side and the bottom base. A discharge valve projects from the bottom base where the first vertical side defines a platform for supporting an RFID tag. The containers are configured to be stackable in a manner to provide simultaneous reading of the multiple RFID tags on the platforms.

6 Claims, 29 Drawing Sheets

Related U.S. Application Data which is a continuation of application No. 16/552,216, filed on Aug. 27, 2019, now Pat. No. 10,645,866.

(60) Provisional application No. 62/724,001, filed on Aug. 28, 2018.

(51) Int. Cl.
*A01M 9/00* (2006.01)
*A01C 23/00* (2006.01)
*A01M 7/00* (2006.01)

(52) U.S. Cl.
CPC ......... *A01M 9/0084* (2013.01); *B67D 3/0032* (2013.01); *B67D 3/0061* (2013.01)

(56) References Cited

U.S. PATENT DOCUMENTS

| | | | |
|---|---|---|---|
| 469,999 A | 3/1892 | Hoos et al. | |
| 600,629 A | 3/1898 | Levi | |
| 781,693 A | 2/1905 | Tandy | |
| 825,263 A | 7/1906 | Alexander et al. | |
| 861,355 A | 7/1907 | Brower | |
| 868,300 A | 10/1907 | Sohner et al. | |
| 924,099 A | 6/1909 | Nelson | |
| 931,882 A | 8/1909 | Martin | |
| 2,794,407 A | 6/1957 | Wist et al. | |
| 2,823,829 A | 2/1958 | Frater | |
| 3,848,772 A | 11/1974 | Aanestad et al. | |
| 4,009,668 A | 3/1977 | Brass et al. | |
| 4,356,934 A | 11/1982 | Knake | |
| 4,497,265 A | 2/1985 | Hood et al. | |
| 4,521,908 A | 6/1985 | Miyaji et al. | |
| 4,522,340 A | 6/1985 | Gandrud | |
| 4,529,073 A | 7/1985 | Lewis | |
| 4,570,858 A | 2/1986 | Binter et al. | |
| 4,611,606 A | 9/1986 | Hall et al. | |
| 4,691,645 A | 9/1987 | Anderson | |
| 4,705,220 A | 11/1987 | Gandrud et al. | |
| 4,895,106 A | 1/1990 | Barnes | |
| 4,896,615 A | 1/1990 | Hood, Jr. et al. | |
| 4,917,304 A | 4/1990 | Mazzei et al. | |
| 4,971,255 A | 11/1990 | Conrad | |
| 5,024,173 A | 6/1991 | Deckler | |
| 5,024,356 A * | 6/1991 | Gerling | A01C 7/102 222/312 |
| 5,029,624 A | 7/1991 | McCunn et al. | |
| 5,060,701 A | 10/1991 | McCunn et al. | |
| 5,112,679 A | 5/1992 | Nakagawa et al. NAME | |
| 5,125,438 A | 6/1992 | McCunn et al. | |
| 5,220,876 A | 6/1993 | Monson et al. | |
| 5,224,577 A | 7/1993 | Falck et al. | |
| 5,301,848 A * | 4/1994 | Conrad | A01C 7/105 251/129.21 |
| 5,379,812 A | 1/1995 | McCunn et al. | |
| 5,524,794 A | 6/1996 | Benedetti, Jr. et al. | |
| 5,539,669 A | 7/1996 | Goeckner et al. | |
| 5,638,285 A | 6/1997 | Newton | |
| 5,641,011 A | 6/1997 | Benedetti, Jr. et al. | |
| 5,687,782 A | 11/1997 | Cleveland et al. | |
| 5,737,221 A | 4/1998 | Newton | |
| 5,740,746 A | 4/1998 | Ledermann et al. | |
| 5,915,313 A | 6/1999 | Bender et al. | |
| 5,931,882 A | 8/1999 | Fick et al. | |
| 5,956,255 A | 9/1999 | Flamme | |
| 6,070,539 A | 6/2000 | Flamme et al. | |
| 6,074,585 A | 6/2000 | Mercuri et al. | |
| 6,122,581 A | 9/2000 | McQuinn | |
| 6,198,986 B1 | 3/2001 | McQuinn | |
| 6,216,615 B1 | 4/2001 | Romans | |
| 6,289,829 B1 | 9/2001 | Fish et al. | |
| 6,296,226 B1 | 10/2001 | Olsen | |
| 6,435,854 B1 | 8/2002 | Sawa et al. | |
| 6,672,229 B2 * | 1/2004 | Lee | A01C 15/005 111/925 |
| 6,748,884 B1 | 6/2004 | Bettin et al. | |
| 6,763,773 B2 | 7/2004 | Shaffert et al. | |
| 6,938,564 B2 | 9/2005 | Conrad et al. | |
| 7,171,912 B2 | 2/2007 | Fraisse et al. | |
| 7,171,913 B1 | 2/2007 | Conrad | |
| 7,270,065 B2 | 9/2007 | Conrad | |
| 7,317,988 B2 | 1/2008 | Johnson | |
| 7,370,589 B2 | 5/2008 | Wilkerson et al. | |
| 7,380,733 B2 | 6/2008 | Owenby et al. | |
| 7,694,638 B1 | 4/2010 | Riewerts et al. | |
| 7,916,022 B2 | 3/2011 | Wilcox et al. | |
| 8,024,074 B2 | 9/2011 | Stelford et al. | |
| 8,141,504 B2 | 3/2012 | Dean et al. | |
| 8,322,293 B2 | 12/2012 | Wollenhaupt et al. | |
| 8,336,470 B2 | 12/2012 | Rans | |
| 8,371,239 B2 | 2/2013 | Rans et al. | |
| 8,371,240 B2 | 2/2013 | Wollenhaupt et al. | |
| 8,504,234 B2 | 8/2013 | Anderson | |
| 8,504,310 B2 | 8/2013 | Landphair et al. | |
| 8,517,230 B2 | 8/2013 | Memory | |
| 8,600,629 B2 | 12/2013 | Zielke | |
| 8,781,693 B2 | 7/2014 | Woodcock | |
| 8,825,263 B1 | 9/2014 | Nelson, Jr. | |
| 8,868,300 B2 | 10/2014 | Kocer et al. | |
| 8,924,099 B2 | 12/2014 | Nelson, Jr. | |
| 9,113,591 B2 | 8/2015 | Shivak | |
| 9,226,442 B2 | 1/2016 | Grimm et al. | |
| 9,820,431 B2 * | 11/2017 | Conrad | A01M 9/0092 |
| 9,907,224 B2 | 3/2018 | Rosengren | |
| 9,918,426 B2 | 3/2018 | Grimm et al. | |
| 10,111,415 B2 | 10/2018 | Kolb et al. | |
| 10,306,824 B2 | 6/2019 | Nelson et al. | |
| 10,440,878 B2 * | 10/2019 | Conrad | A01M 9/0092 |
| 10,542,663 B2 | 1/2020 | Rosengren | |
| 2003/0226484 A1 | 12/2003 | O'neall et al. | |
| 2004/0231575 A1 | 11/2004 | Wilkerson et al. | |
| 2004/0244658 A1 | 12/2004 | Conrad et al. | |
| 2007/0193483 A1 | 8/2007 | Conrad | |
| 2007/0266917 A1 | 11/2007 | Riewerts et al. | |
| 2010/0101466 A1 | 4/2010 | Riewerts et al. | |
| 2010/0282141 A1 | 11/2010 | Wollenhaupt et al. | |
| 2010/0282143 A1 | 11/2010 | Preheim et al. | |
| 2010/0282144 A1 | 11/2010 | Rans et al. | |
| 2010/0282147 A1 | 11/2010 | Wollenhaupt et al. | |
| 2011/0035055 A1 * | 2/2011 | Applegate | A01C 21/00 700/265 |
| 2011/0054743 A1 | 3/2011 | Kocer et al. | |
| 2011/0296750 A1 | 12/2011 | Davis et al. | |
| 2012/0010789 A1 | 1/2012 | Dulnigg | |
| 2012/0042815 A1 | 2/2012 | Wonderlich | |
| 2013/0061789 A1 | 3/2013 | Binsirawanich et al. | |
| 2013/0061790 A1 | 3/2013 | Binsirawanich et al. | |
| 2013/0085598 A1 | 4/2013 | Kowalchuk | |
| 2013/0121101 A1 | 5/2013 | Olchampaugh et al. | |
| 2013/0152835 A1 | 6/2013 | Stevenson et al. | |
| 2013/0192503 A1 | 8/2013 | Henry et al. | |
| 2014/0026792 A1 | 1/2014 | Bassett | |
| 2014/0048002 A1 | 2/2014 | Grimm et al. | |
| 2014/0183182 A1 | 7/2014 | Oh et al. | |
| 2014/0252111 A1 | 9/2014 | Michael et al. | |
| 2014/0263705 A1 | 9/2014 | Michael et al. | |
| 2014/0263708 A1 | 9/2014 | Thompson et al. | |
| 2014/0263709 A1 | 9/2014 | Kocer et al. | |
| 2014/0277780 A1 | 9/2014 | Jensen et al. | |
| 2014/0284400 A1 | 9/2014 | Hebbert et al. | |
| 2015/0094916 A1 | 4/2015 | Bauerer et al. | |
| 2015/0097707 A1 | 4/2015 | Nelson, Jr. et al. | |
| 2015/0195988 A1 | 7/2015 | Radtke et al. | |
| 2015/0223391 A1 | 8/2015 | Wendte et al. | |
| 2015/0334912 A1 | 11/2015 | Sauder et al. | |
| 2016/0073576 A1 | 3/2016 | Grimm et al. | |
| 2016/0374260 A1 | 12/2016 | Kowalchuk | |
| 2017/0000022 A1 * | 1/2017 | Conrad | A01C 7/06 |
| 2017/0049044 A1 | 2/2017 | Stoller et al. | |
| 2018/0049367 A1 | 2/2018 | Gamer et al. | |
| 2018/0054958 A1 | 3/2018 | Levy et al. | |
| 2018/0177119 A1 | 6/2018 | Grimm et al. | |
| 2018/0192577 A1 | 7/2018 | Smith et al. | |
| 2018/0359909 A1 | 12/2018 | Conrad et al. | |

(56) References Cited

U.S. PATENT DOCUMENTS

| | | | |
|---|---|---|---|
| 2019/0053422 A1* | 2/2019 | Holst | B62D 49/065 |
| 2019/0059204 A1 | 2/2019 | Kowalchuk | |
| 2019/0124907 A1 | 5/2019 | Kolb et al. | |

FOREIGN PATENT DOCUMENTS

| | | |
|---|---|---|
| KR | 20120039829 A | 4/2012 |
| WO | 8808244 A1 | 11/1988 |
| WO | 2011025592 A1 | 3/2011 |
| WO | 2013191990 A2 | 12/2013 |
| WO | 2014018717 A1 | 1/2014 |
| WO | 2013191990 A3 | 2/2014 |
| WO | 2015061570 A1 | 4/2015 |

OTHER PUBLICATIONS

Screenshot from http://www.amvacsmartbox.com/Portals/0/Guides/DropTubes/Drop%20Tube%20-%20John%20Deere%20-%20Reart%20Mount.PD, downloaded on Jul. 13, 2017 (1 Page).

European Application No. EP-14 85 5768.9, European Extended Search Report and Written Opinion of the European Searching Authority dated May 10, 2017 Attached to Pursuant to Rule 62 EPC and Cited References (92 Pages).

European Application No. EP-19 15 2958, European Search Report and the European Seach Opigion of the European Searching Authority dated May 28, 2019 (17 Pages).

Bayercropscience LP, Aztec 4/67% Granular Insecticide for Use in Smartbox System Only, dated Oct. 16, 2003, from https://www3.epa.gov/pesticides/chem_search/ppls/000264-00811-20031016.pdf, downloaded Oct. 31, 2019 (5 Pages).

U.S. Environmental Protection Agency. Notice of Pesticide: Registration, dated Feb. 10, 2009 from https://www3.epa.gov/pesticides/chem_search/ppls/005481-00562-20090210.pdf, downloaded Oct. 31, 2019 (11 Pages).

International Application No. PCT/US2019/46516, International Search Report and the Written Opinion of the International Searching Authority, or the Declaration dated Dec. 4, 2019 (14 Pages).

International Application No. PCT/US2019/48331, International Search Report and the Written Opinion of the International Searching Authority, or the Declaration dated Feb. 10, 2020 (20 Pages).

KR20120039829 Including Translation Thereof as Cited in the ISR & WO for International Application No. PCT/2019/48331 (22 Pages).

International Application No. PCT/US20/50404, International Search Report and the Written Opinion of the International Searching Authority, or the Declaration dated Dec. 9, 2020 (12 Pages).

* cited by examiner

SYSTEM AND METHOD FOR STACKING CONTAINERS

CROSS REFERENCE TO RELATED APPLICATIONS

This patent application is a continuation in part of U.S. application Ser. No. 16/872,379, issued as U.S. Pat. No. 11,039,569, filed May 12, 2020, entitled CONTAINER SYSTEM FOR TRANSPORTING AND DISPENSING AGRICULTURAL PRODUCTS which is a continuation of U.S. application Ser. No. 16/552,216, issued as U.S. Pat. No. 10,645,866 filed Aug. 27, 2019, entitled CONTAINER SYSTEM FOR TRANSPORTING AND DISPENSING AGRICULTURAL PRODUCTS, which claims the benefit of U.S. Provisional Application. No. 62/724,001 filed Aug. 28, 2018, entitled CONTAINER SYSTEM FOR TRANSPORTING AND DISPENSING AGRICULTURAL PRODUCTS. U.S. application Ser. Nos. 16/872,379, 16/552,216 and Provisional Application. No. 62/724,001 are incorporated by reference herein in their entireties.

BACKGROUND OF THE INVENTION

1. Field of the Invention

The present invention relates generally to container systems for transporting and dispensing agricultural products and more particularly to a system for stacking a plurality of containers which provides the capability of providing convenient, efficient reading of RFID tags on the containers.

2. Description of the Related Art

Dispensing of multiple agricultural products, liquid and/or dry, at low use-rate and/or while using prescriptive application equipment, is of increasing importance in agricultural systems. Low use-rate agricultural crop input products, (including, but not limited to: insecticides, nematicides, herbicides, fungicides, nutrients, plant and soil health stimulants, plant growth regulators, and fertilizers/plant nutritionals), combined with prescriptive application, reduces the total volume of these inputs that are handled by manufacturing, freight, warehousing and agricultural workers. Reduced handling means reduced worker exposure, and when these products are packaged in closed delivery system containers, worker exposure is reduced even more, due to the fact that agricultural workers aren't required to be in direct contact with the containers as product is dispensed from the container in preparation for or during application. Closed delivery system containers eliminate the exposure that is normally associated with opening, pouring, and mixing chemicals that are packaged in containers that require such actions.

An example of the use of multiple agricultural product containers for dispensing low-rate agricultural crop input products is illustrated in, for example, U.S. application Ser. No. 14/521,908, now U.S. Pat. No. 9,820,431, entitled SYSTEM AND PROCESS FOR DISPENSING MULTIPLE AND LOW RATE AGRICULTURAL PRODUCTS.

An example of the prescriptive application of a material dispensing system that simultaneously dispenses crop input products at specific prescriptive rates at georeferenced locations throughout the field is illustrated in, for example, U.S. application Ser. No. 15/614,547, entitled SYSTEM FOR PROVIDING PRESCRIPTIVE APPLICATION OF MULTIPLE PRODUCTS.

The use of a combination of dry agricultural product dispensing systems and syringe-type liquid pumps is disclosed in U.S. application Ser. No. 16/122,660, entitled SYSTEM AND METHOD FOR DISPENSING MULTIPLE LOW RATE AGRICULTURAL PRODUCTS.

U.S. application Ser. Nos. 14/521,908, 15/614,547, 16/122,660, 16/872,379 are incorporated by reference herein in their entireties.

Typically, a number of containers need to be stored and inventoried, but heretofore a system for maintaining such storage and inventory has been deficient. As will be disclosed below, the present system for stacking the containers provides the capability of stacking a number of containers on, for example, a pallet, and allowing for efficient reading of RFID tags on those stacked containers.

SUMMARY OF THE INVENTION

In one aspect, the present invention is embodied as a method and system for stacking a number of containers. Each container includes a front face having a truncated trapezoidal shape, a rear face having a truncated trapezoidal shape, a top base, a bottom base, a first vertical side adjacent to the top base, a second vertical side adjacent to the top base, a first sloped side between the first vertical side and the bottom base, a second sloped side between the second vertical side and the bottom base. The front face, rear face, top base, bottom base, first vertical side, and second vertical side are configured to define an enclosure. A discharge valve projects from the bottom base where the first vertical side defines a platform for supporting an RFID tag. Each layer of containers includes a first container, a second container positioned adjacent to the first container so that their respective top bases abut, a third container positioned adjacent to the second container so that its second sloped side abuts a second sloped side of the second container, a fourth container positioned adjacent to the third container so that its first sloped side abuts the first sloped side of the third container, a fifth container positioned adjacent to the fourth container so that their respective top bases abut, a sixth container positioned adjacent to the fifth container so that its second sloped side abuts the second sloped side of the fifth container and a first sloped side of the sixth container abuts a second sloped side of said first container. The first container, the second container, the third container, the fourth container, the fifth container and the sixth container are positioned about a central axis. Additional layers of containers along the central axis are configured the same as the first layer of containers, where the first vertical side defining a platform for supporting an RFID tag is external for providing efficient reading of RFID tags on the platforms.

In one aspect, the present invention is embodied as a container system for transporting and dispensing agricultural products. The container system includes a housing assembly and a set of agricultural product containers. The housing assembly has multiple slot assemblies for containers. The agricultural product containers are configured to be releasably contained within the slot assemblies. The set of agricultural product containers may include liquid agricultural product containers and dry agricultural product containers. The slot assemblies and agricultural product containers are cooperatively configured to provide the ability to utilize either of said liquid or said dry agricultural product containers within said slot assemblies.

In another broad aspect, the invention is embodied as a housing assembly for a container system configured to transport and dispense agricultural products. The housing assembly includes a number of slot assemblies; push assemblies; and lock-arm assemblies. Each push assembly is associated with a respective slot assembly. Each lock arm assembly is operably connectable to a push assembly so that actuation of the push assembly by a user disengages a lock arm assembly from a container, providing for the capability to release the container from the slot assembly.

When the container is released from the slot assembly a discharge valve assembly connected to a container is simultaneously closed. The simultaneous closing of the container discharge valve when the lock arm assembly is disengaged or released is important as it prevents removal of the container if the discharge valve is still open. The discharge valve is designed to allow opening only by means of the "key" which is part of the mechanism which opens and closes the discharge valve in concert with the operation of the lock arm assembly. This ensures that the container can only be opened via the mechanical operation of the combination lock arm assembly and container discharge valve assembly. In other words, the container discharge valve can't be opened by an individual without destroying the container or discharge valve, unless the container is installed into the slot assembly. Preventing the container from opening until it has been properly installed in the container slot assembly, and the combination lock arm assembly and container valve mechanism have been mechanically manipulated, prevents product from leaking from the container valve when the container is not installed in the container slot. Interconnecting the container lock assembly mechanism (i.e. push assembly and lock arm assembly) with the discharge valve mechanism, disallows removal of the product container from the slot assembly until the container lock assembly mechanism has been disengaged and the container discharge valve has been completely closed. This prevents product from being leaked or spilled from a container that might otherwise be removed from the slot assembly prior to closing the container discharge valve. The slot assemblies are configured to accommodate liquid agricultural product containers and dry agricultural product containers. The slot assemblies and agricultural product containers are cooperatively configured to provide the ability to utilize either of said liquid or said dry agricultural product containers within said slot assemblies. Additionally, the slot assemblies, the lock arm assemblies, and the container discharge valve assembles are designed in such a manner as to facilitate quick and easy installation and exchange of product containers.

It is normally feasible for an operator with no prior training to be able to install a container and manipulate the combination container lock assembly mechanism and discharge valve assembly operation within a span of time of as little as 10 seconds, and it takes just about the same length of time to remove one container and replace it with another. An additional feature of this invention is that little to no additional time is required when switching from a dry product to a liquid product, or vice versa. In other words, one can remove a dry product container and replace it with a liquid product container in just about the same short time period as required to replace a dry product container with another dry product container. The same holds true if one wishes to replace a liquid container with a dry product container.

In another broad aspect, the invention is embodied as a container having front and rear faces with truncated trapezoidal shapes. One of the sides defines a platform for supporting an RFID tag.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
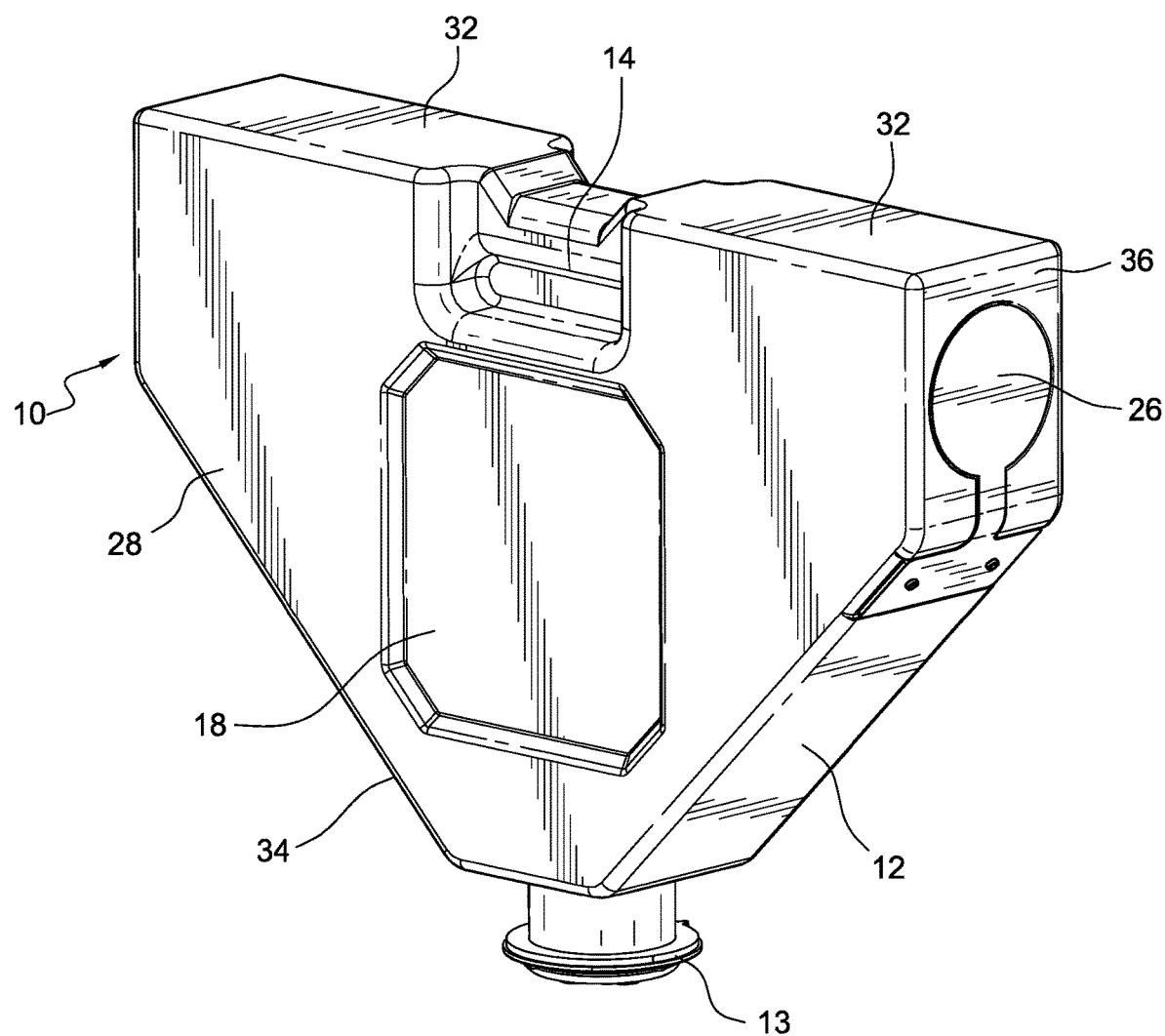
FIG. 1 is a top, front, left side perspective view of a dry agricultural product container in accordance with the principles of the present invention.
Figure 2:
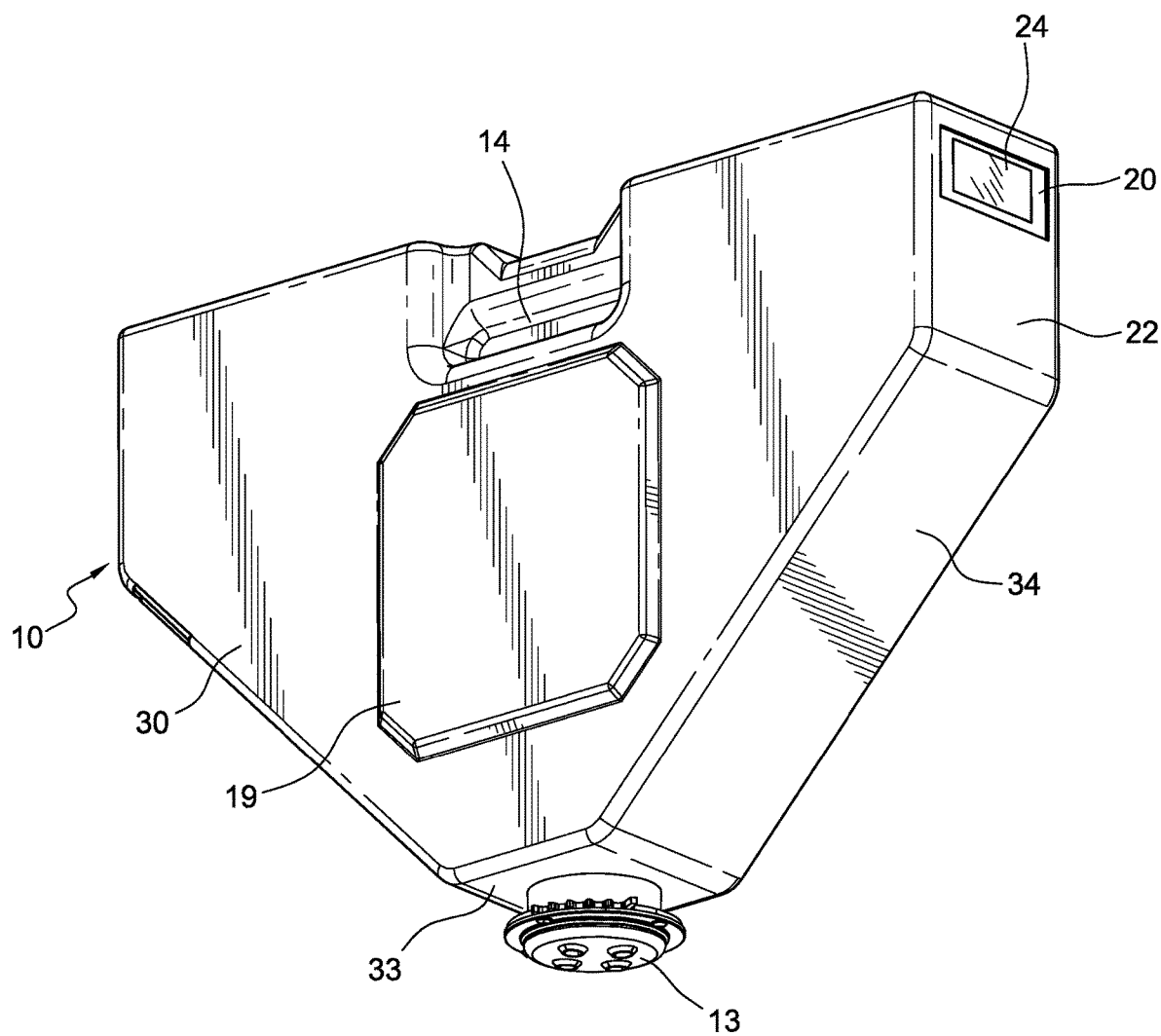
FIG. 2 is a bottom, front, right side perspective view thereof.
Figures 3, 4:
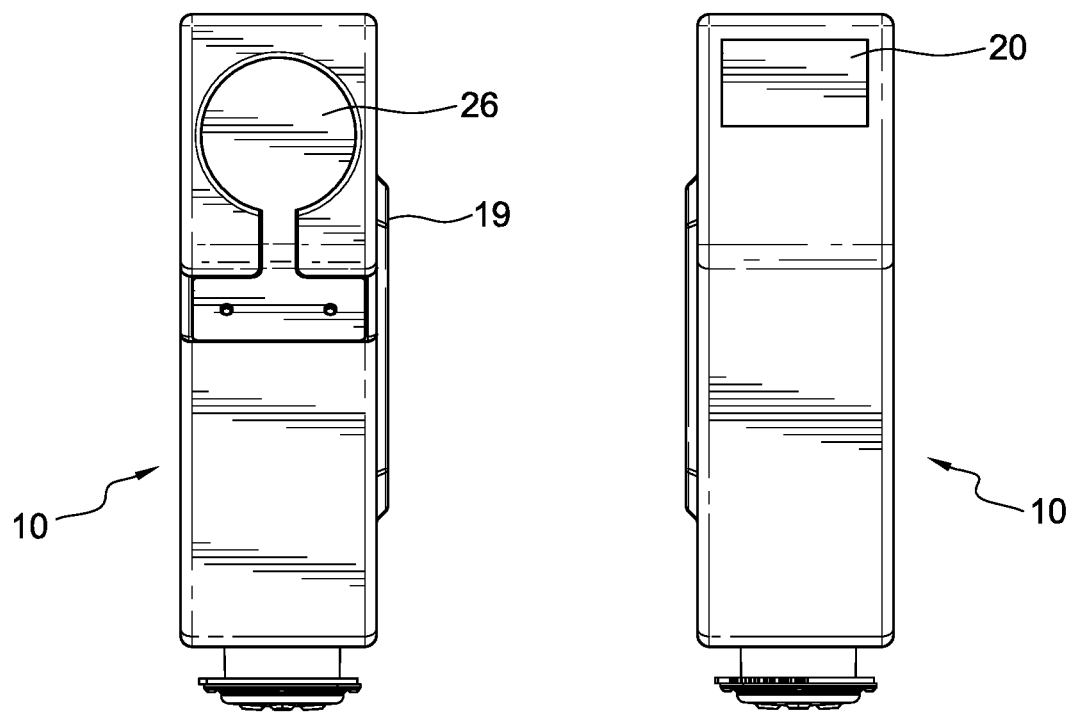
FIG. 3 is left side elevation view thereof.
FIG. 4 is right side elevation view thereof.
Figure 5:
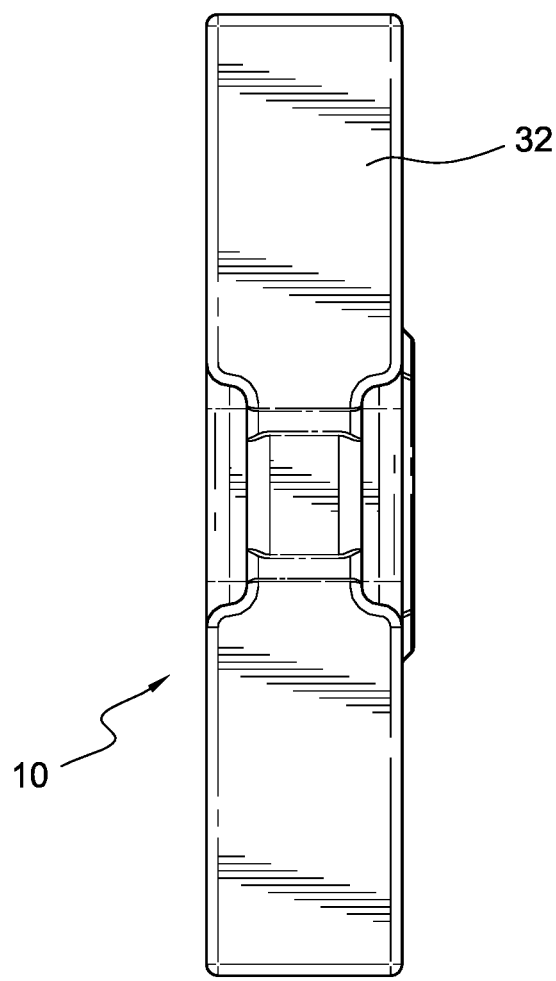
FIG. 5 is a top plan view thereof.
Figure 6:
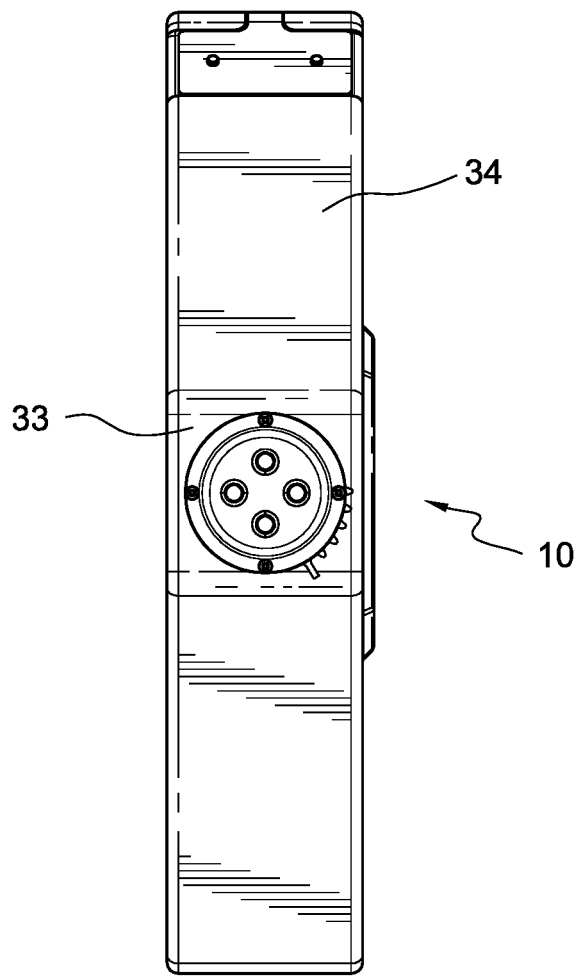
FIG. 6 is a bottom plan view thereof.
Figure 7:
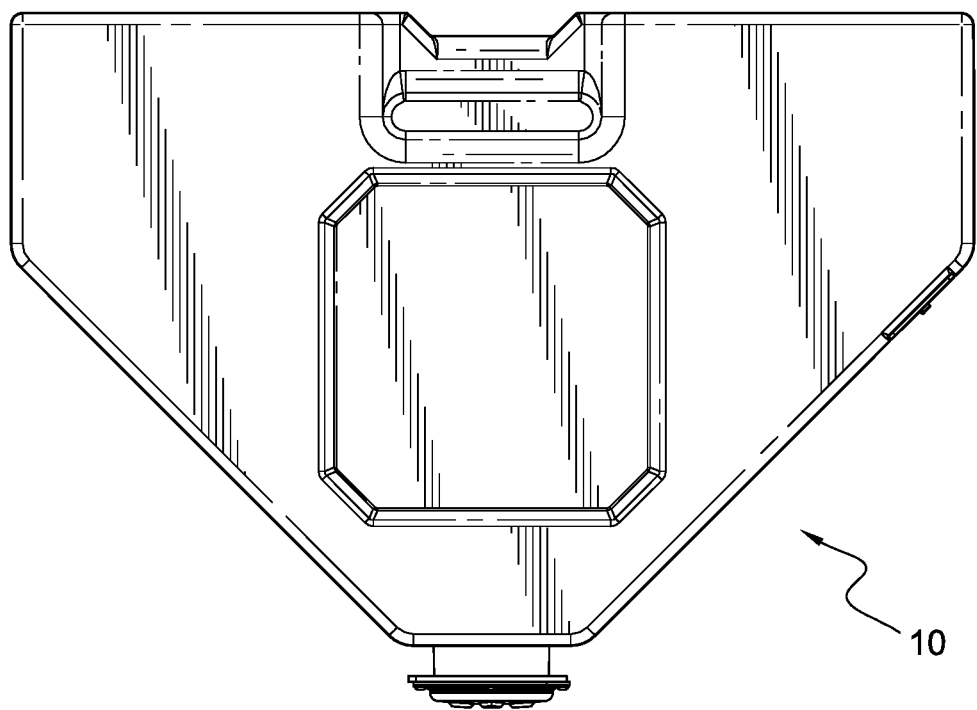
FIG. 7 is a front plan view thereof.
Figure 8:
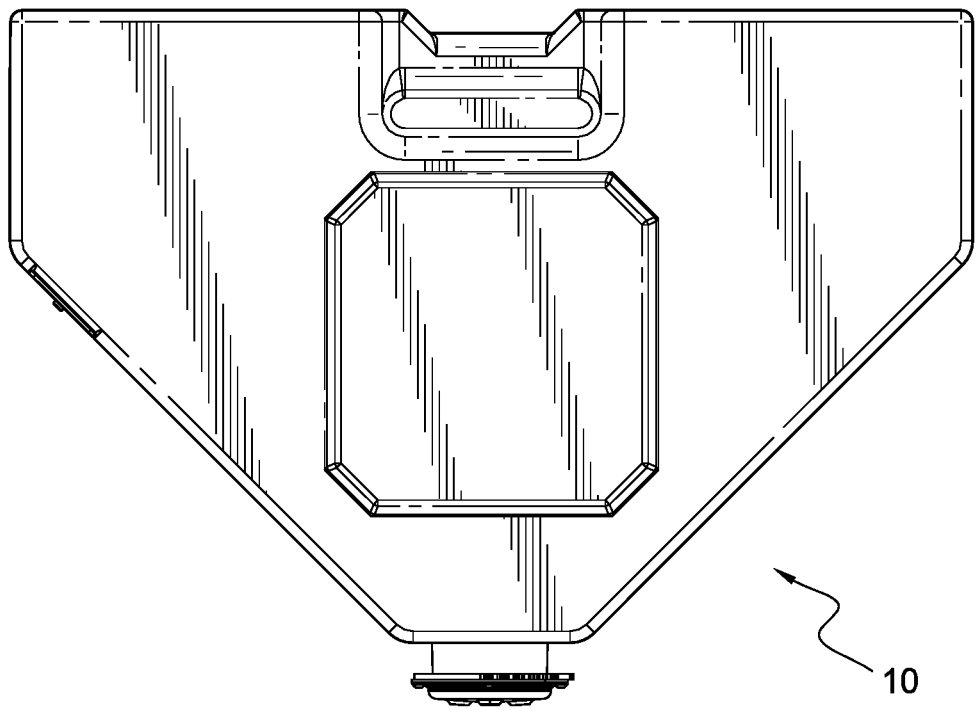
FIG. 8 is a rear plan view thereof.
Figure 9:
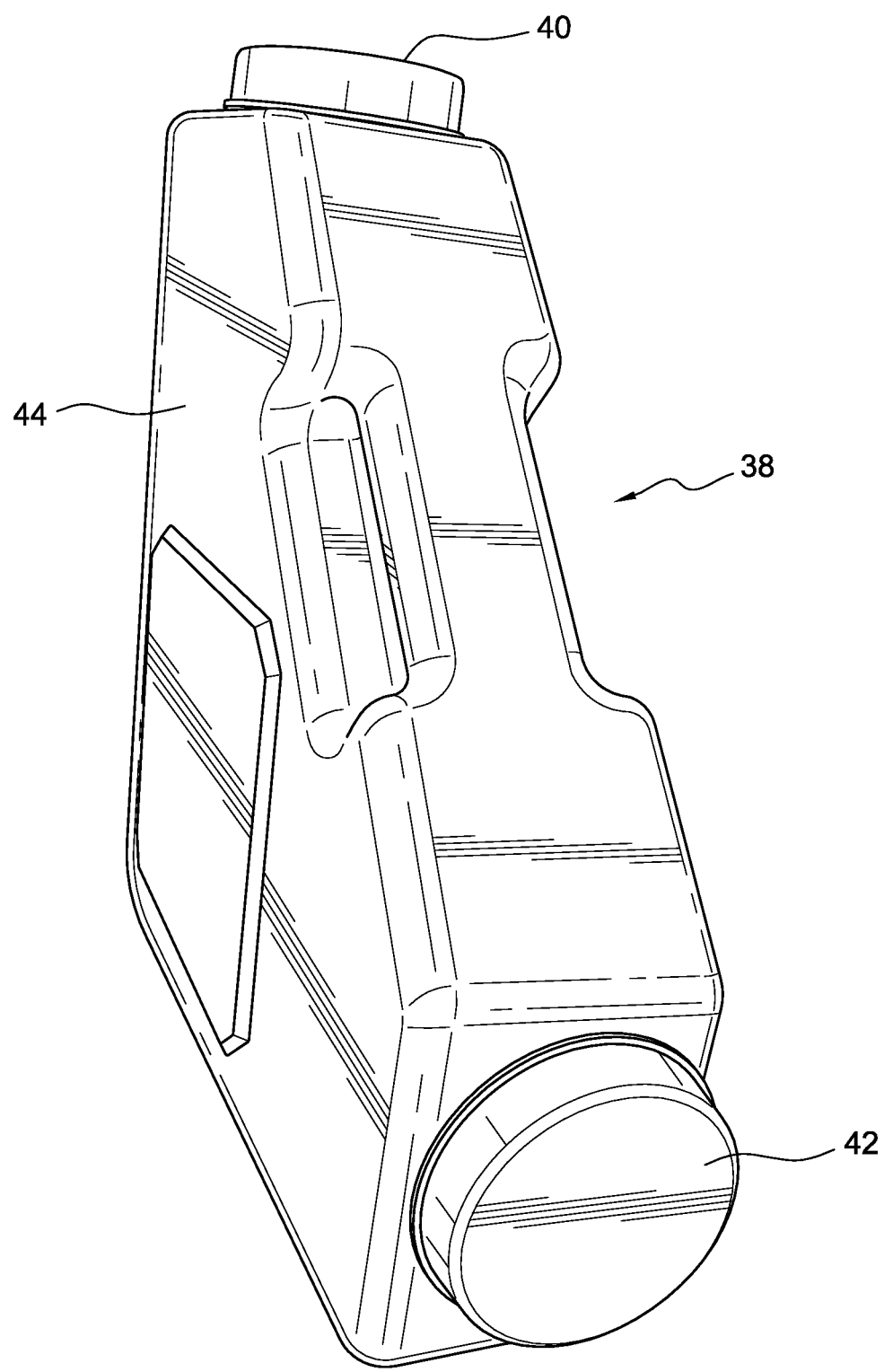
FIG. 9 is a top, front, left side perspective view of a liquid agricultural product container in accordance with the principles of the present invention.
Figure 10:
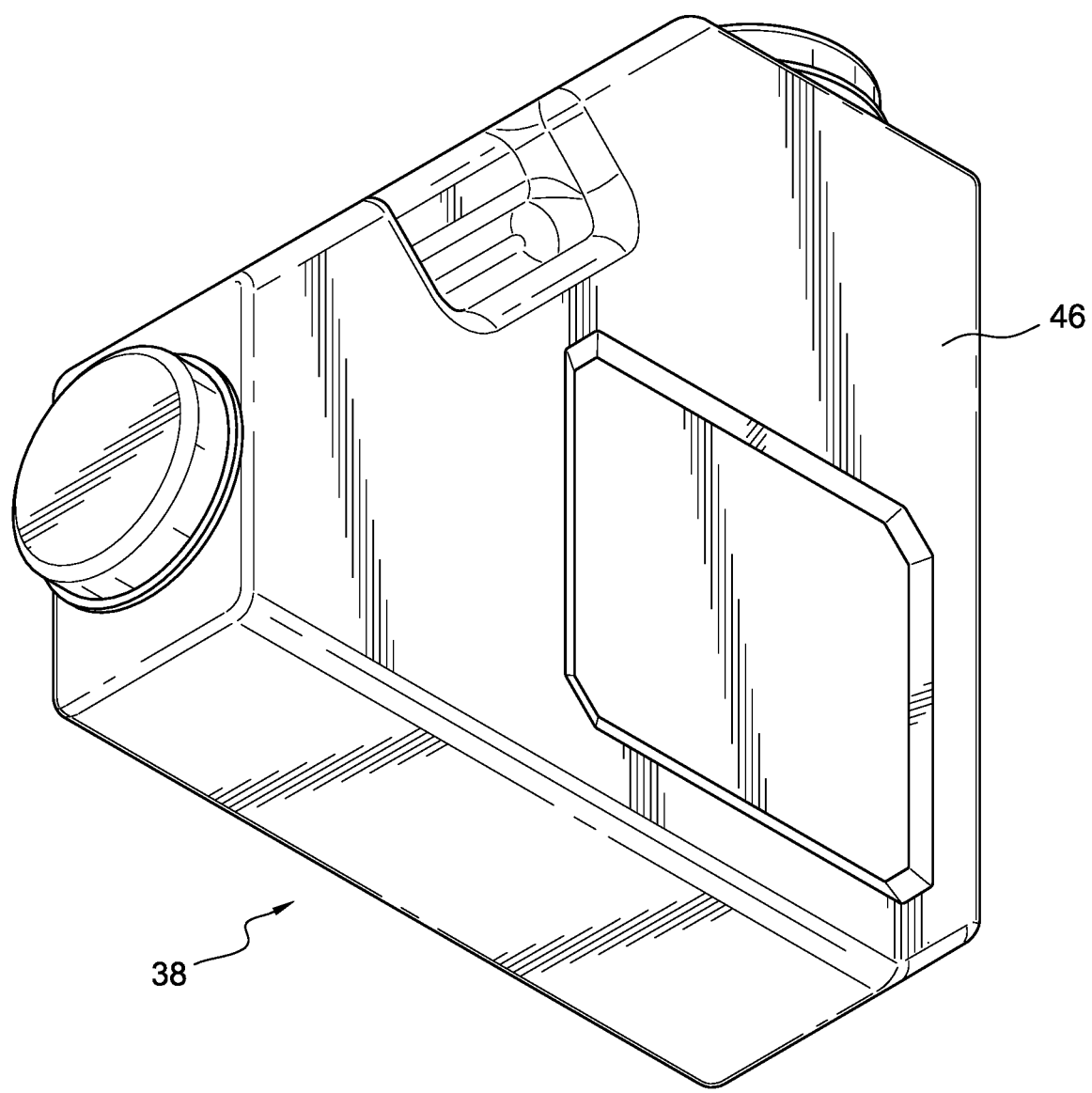
FIG. 10 is a bottom, front, right side perspective view thereof.
Figure 11:
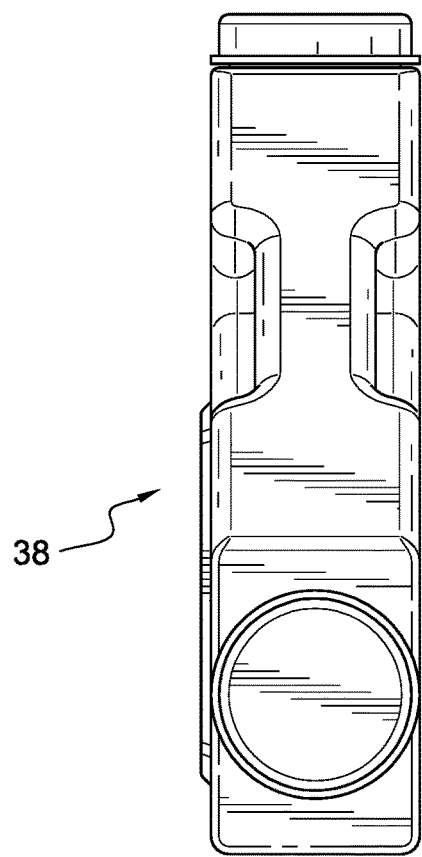
FIG. 11 is left side elevation view thereof.
Figure 12:
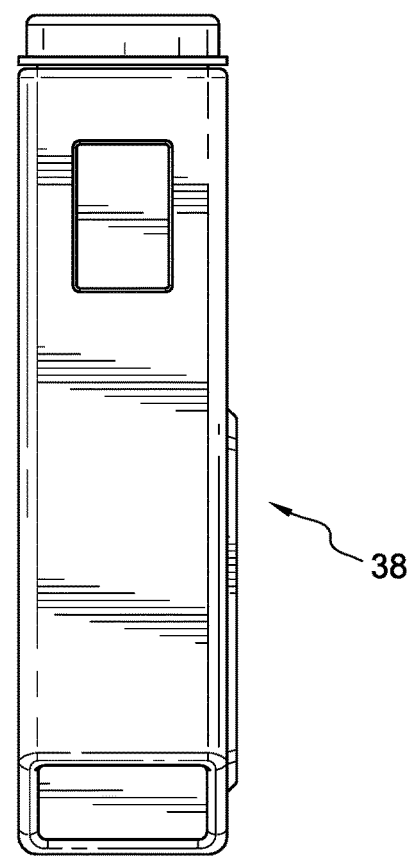
FIG. 12 is right side elevation view thereof.
Figure 13:
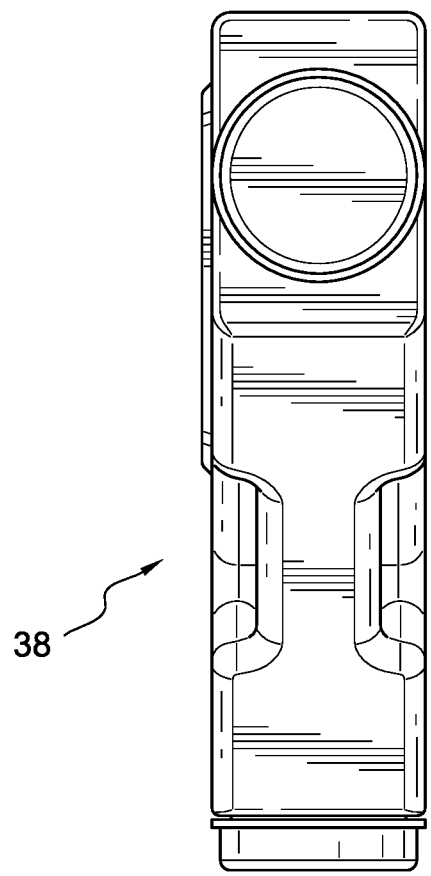
FIG. 13 is a top plan view thereof.
Figure 14:
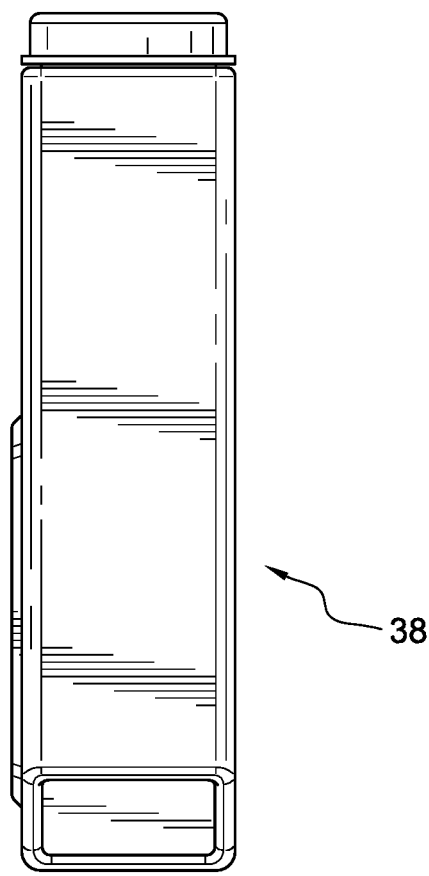
FIG. 14 is a bottom plan view thereof.
Figure 15:
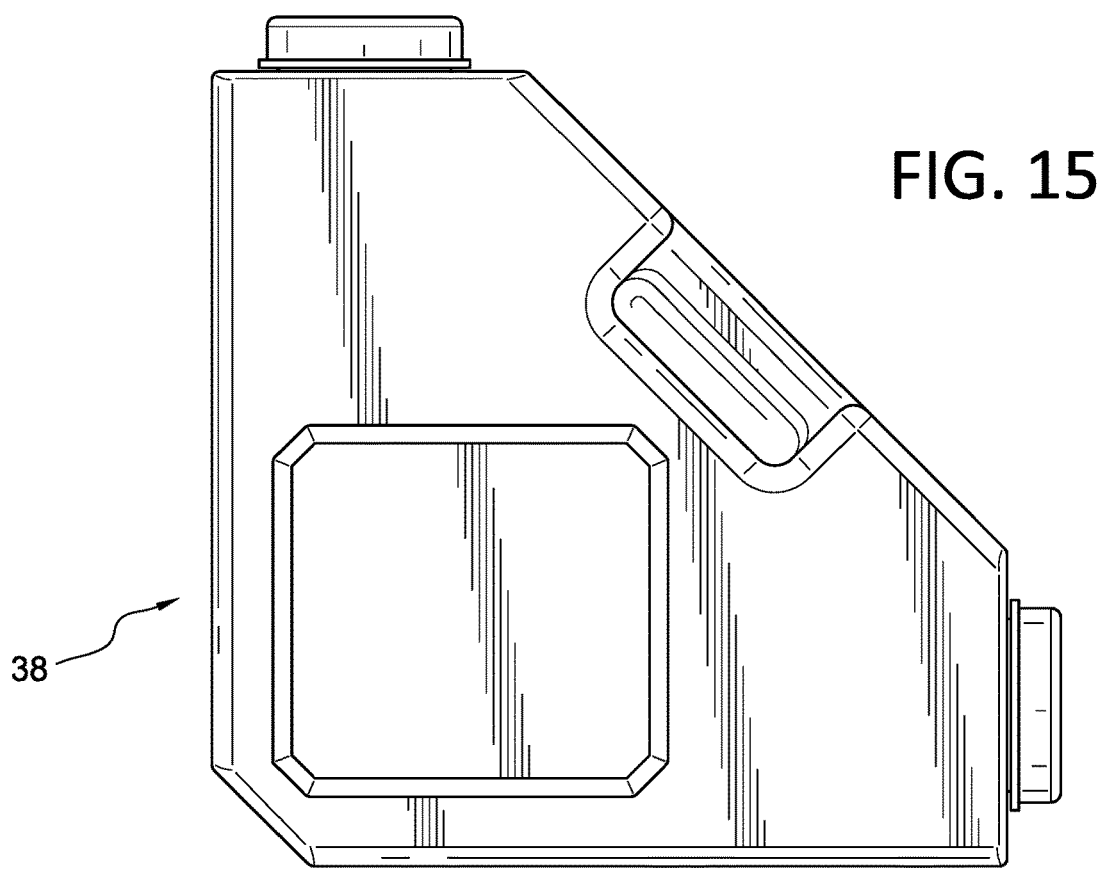
FIG. 15 is a front plan view thereof.
Figure 16:
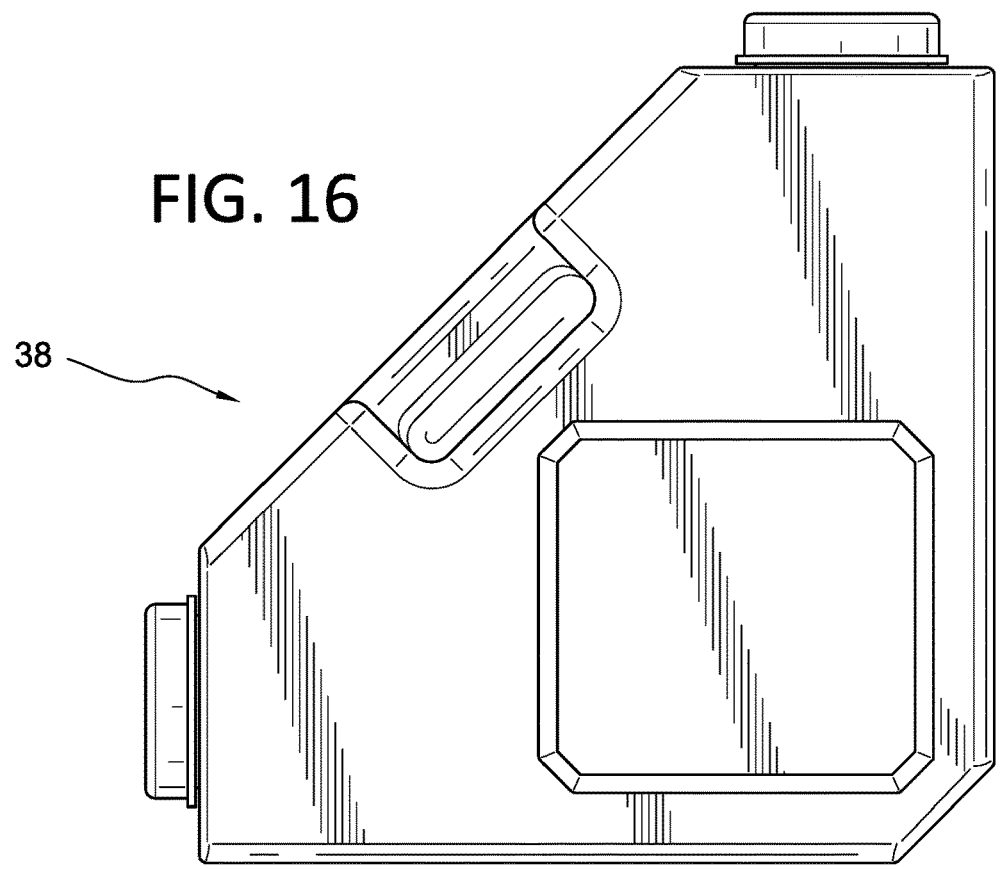
FIG. 16 is a rear plan view thereof.
Figure 17:
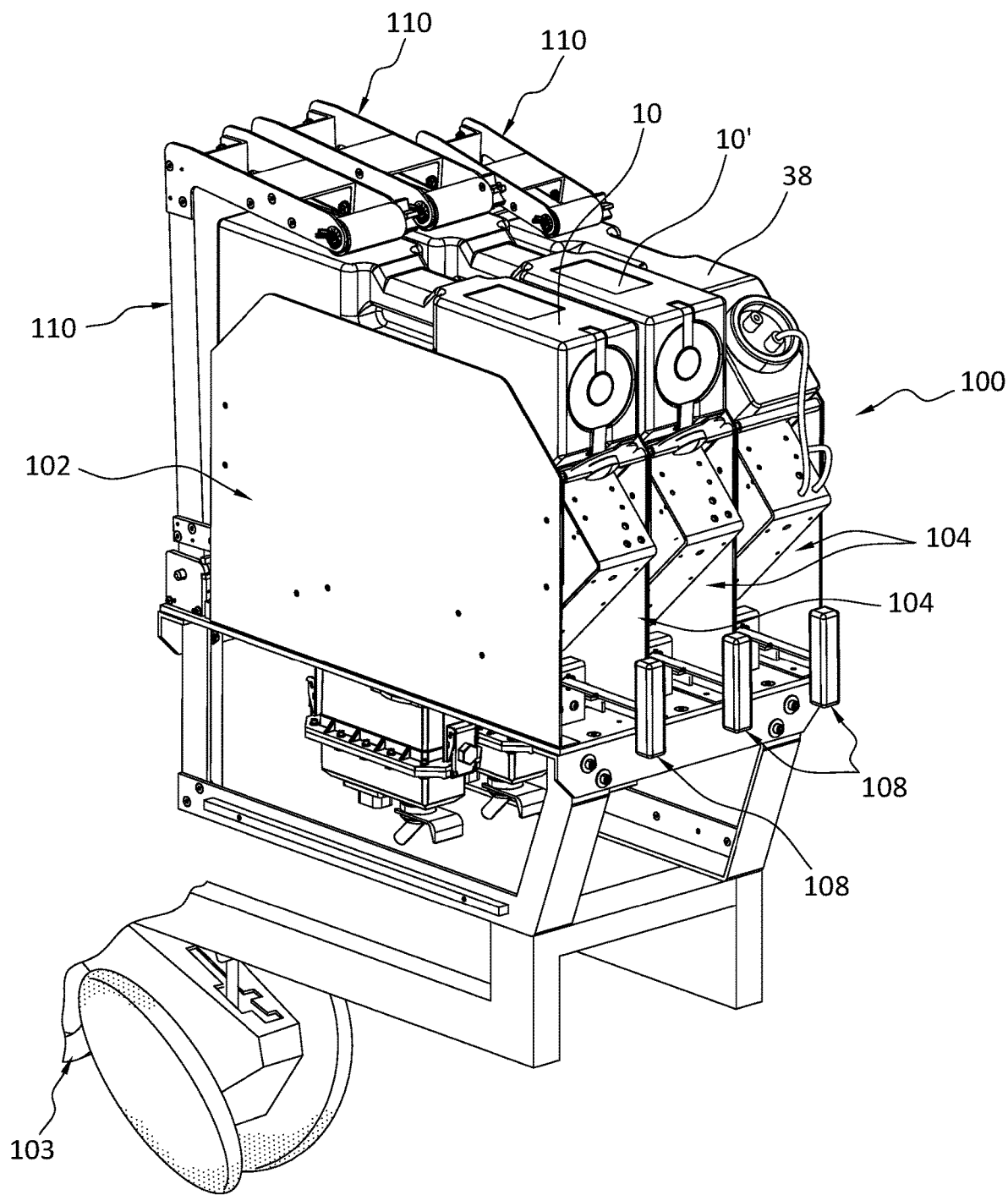
FIG. 17 is a perspective view of a container system for transporting and dispensing agricultural products, shown positioned on a planter.

Referring now to the drawings and the characters of reference marked thereon, FIGS. 1-8 illustrate a dry agricultural product container 10, in accordance with the principles of this invention, having a trapezoidal configuration that allows dry agricultural product, typically a flowable, granular material, to gravity flow down sides 12, through a discharge port, to a removable attached discharge valve 13. Handle 14 provides a method of carrying the container 10. A recessed panel 18, having a beveled edge, is designed to nest into a matching raised panel 19 on an adjacent container on a container pallet (not shown) thus designed to locate and prevent the containers from shifting in transit. A raised panel 19 (see FIG. 2), having a complementary shape with recessed panel 18 of container 10, is designed to have containers interlock when stacked upon one another. A recessed rectangular platform 20, on a vertical side 22 of container 10, provides a protective area for placement of an RFID tag 24. Weather cap 26, of container 10, provides protection from the elements ensuring granular product is free of moisture. The weather cap 26 covers a filling opening.

This unique shape for a dry agricultural product container provides an efficient trapezoidal flow path. As used herein, when referring to the trapezoidal flow path, the term "trapezoidal flow path" refers broadly to a flow path that has a larger width adjacent to the product volume and a smaller width at the outlet, regardless of whether the taper between the larger width and smaller width is continuous or discontinuous or interrupted or uninterrupted.

In the preferred embodiment, illustrated in FIGS. 1-8, the front face 28 and the rear face 30 each have a truncated trapezoidal shape. As used herein the term "truncated trapezoidal shape" refers to a trapezoid with two truncated apices. In this preferred embodiment the front face 28, the rear face 30, a top base 32, a bottom base 33, a first vertical side 36 adjacent to the top base 32, the second vertical side 22 adjacent to the top base 32, the first sloped side 12 between the first vertical side 36 and the bottom base 33, a second sloped side 34 between the second vertical side 22 and the bottom base 34, are collectively configured to form an enclosure.

This dry agricultural product container 10 cooperates in a synergistic manner with a liquid agricultural product container, as will be discussed below.

Referring now to FIGS. 9-16, a liquid agricultural product container, designated generally as 38, is illustrated. The liquid agricultural product container 38 preferably includes two protective caps 40, 42 for shipping and storage. One of the top caps is removable for filling the liquid agricultural product container. The other cap is removable to provide access for appropriate fluid conduits. In this preferred embodiment of a liquid container shown in FIGS. 9-16 the front face 44 and the rear face 46 each have an "angled, truncated trapezoidal shape" referring to apices that are not only truncated but also angled.

Referring now to FIGS. 17-29, an overall container system, designated generally as 100 is illustrated. The container system 100, for transporting and dispensing agricultural products, includes a housing assembly 102 and a set of agricultural product containers 10, 10', and 38. The housing assembly 102 is shown secured to a planter 103. The housing assembly 102 includes a number of slot assemblies 104 for the containers 10, 10', and 38. The agricultural product containers are configured to be releasably contained within the slot assemblies 104. In these figures, the set of agricultural product containers includes a liquid agricultural product container 38 and two dry agricultural product containers 10, 10'. The slot assemblies 104 and agricultural product containers are cooperatively configured to provide the ability to interchange any of the agricultural product containers within the slot assemblies. In other words, dry agricultural product containers can be placed in any of the slots and liquid agricultural product containers can be placed in any of the slots. In the example shown in these figures three containers are illustrated, two being dry agricultural product containers 10, 10' and one being a liquid agricultural product container 38. However, it is understood that container system 100 can be manufactured to include a desired number of slot assemblies 104.

The housing assembly 102 includes push assemblies 108, each associated with a respective slot assembly 104. Lock arm assemblies 110 are operably connected to the push assemblies 108, wherein actuation of a push assembly 108 by a user disengages a lock arm assembly 110 from a container providing for the capability to release the container from the slot assembly 104.

FIGS. 18-22 show two dry containers 10, 10', 38 being removed from the housing assembly 102, with one of the dry containers being replaced. The dry agricultural containers are oriented within the slot assemblies 104 so that the discharge valve 13 is positioned on the bottom.

Figure 18:
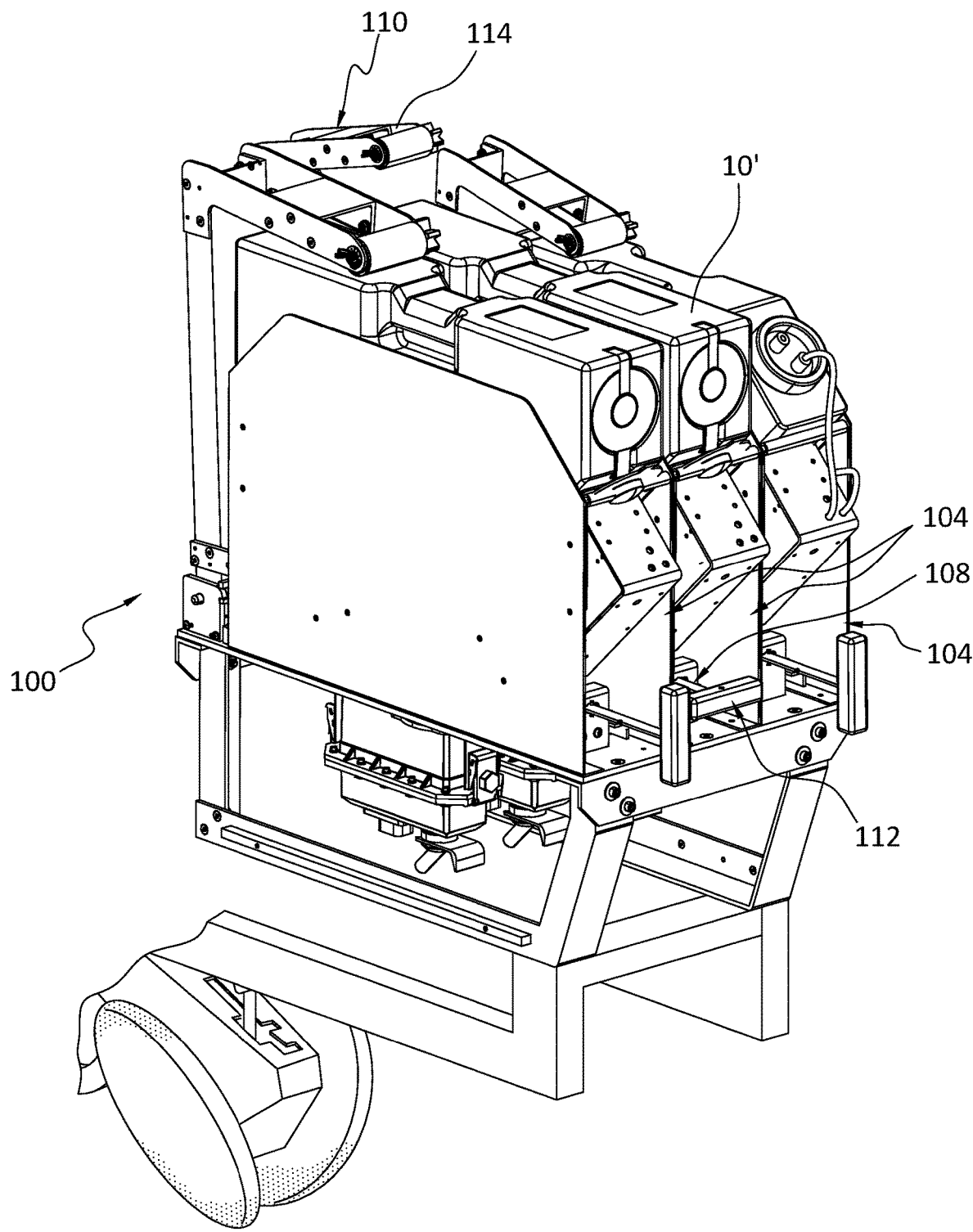
FIG. 18 illustrates a first step in the manner in which a dry container is released from the housing assembly of container system.

FIG. 18 illustrates a first step in the manner in which a dry container 10' is released from the system 100. In a first step the operator rotates a handle element 112 and pushes it in. This causes a hold down (release) arm 114 of the lock arm assembly 110 to rotate up and away from an associated container. (The ability to provide this actuation will be discussed in detail below with respect to FIG. 29.)

Figure 19:
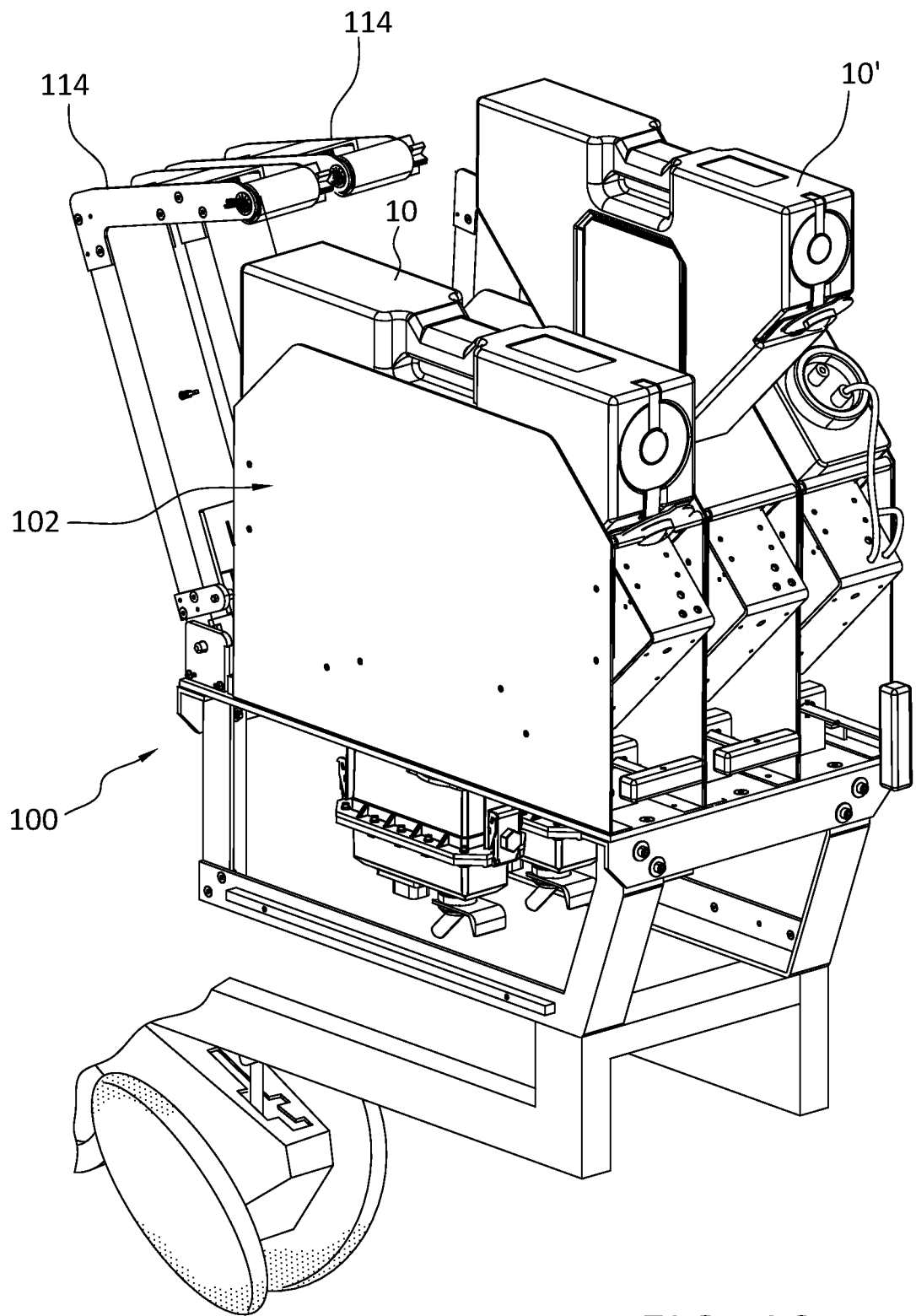
FIG. 19 shows a dry container being removed from the housing assembly.

FIG. 19 shows the dry container 10' being removed from the housing assembly 102. (The hold down arm 114 associated with the end dry container 10 also shown lifted in the first step toward its removal.)

Figure 20:
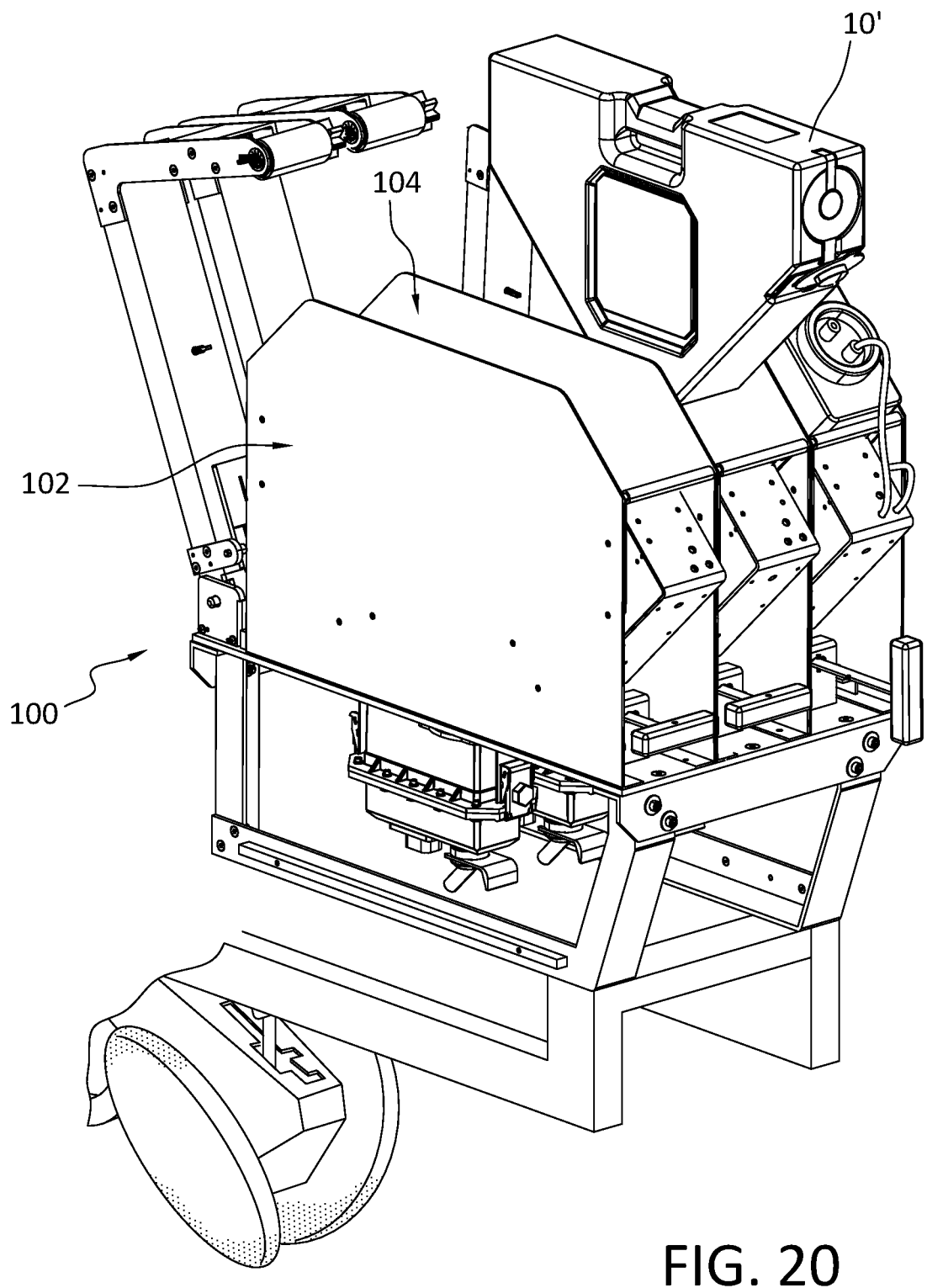
FIG. 20 shows two push assemblies of the housing assembly opened, a dry container shown being installed.

FIG. 20 shows two push assemblies 108 opened, one of the dry containers 10' shown being installed, one of the slot assemblies 104 being empty. Thus, for example, one of the dry containers can be swapped with another dry container.

Figure 21:
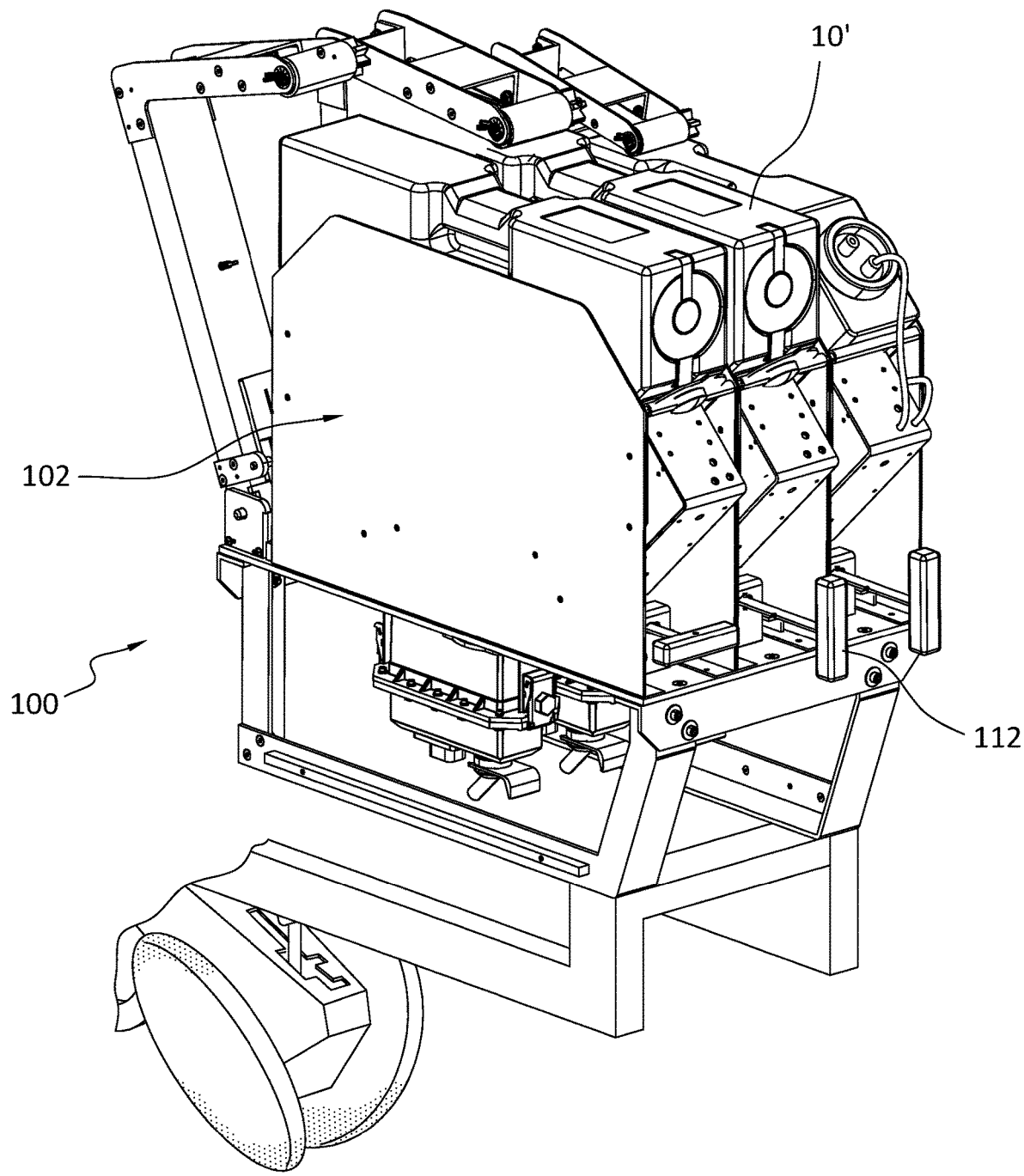
FIG. 21 illustrates engagement of the handle element to secure a container in the housing assembly.

FIG. 21 illustrates engagement of the handle element 112 to secure the (middle) dry container 10' in the housing assembly. The associated handle element 112 has been pushed out to hold the middle container 10' in place.

Figure 22:
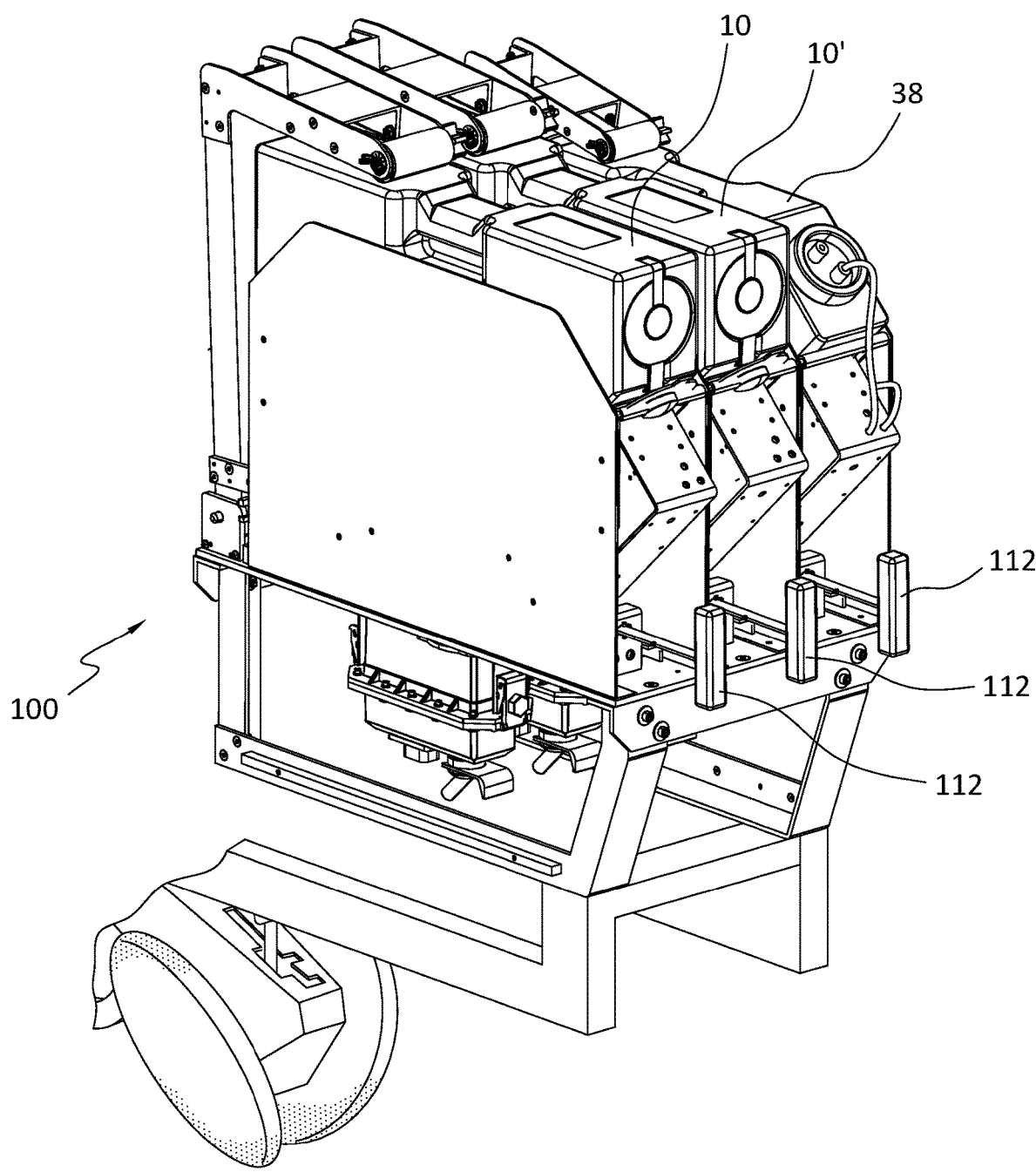
FIG. 22 shows the containers in place.

FIG. 22 shows the containers 10, 10', 38 in place within the housing assembly 102. Orientation of the handle element 112 to a vertical position indicates that the agricultural product is ready to be dispensed.

Each of the slot assemblies are preferably configured to accommodate either liquid agricultural product containers or dry agricultural product containers. The slot assemblies and agricultural product containers are preferably cooperatively configured to provide the ability to interchange the agricultural product containers within the slot assemblies.

Figure 23:
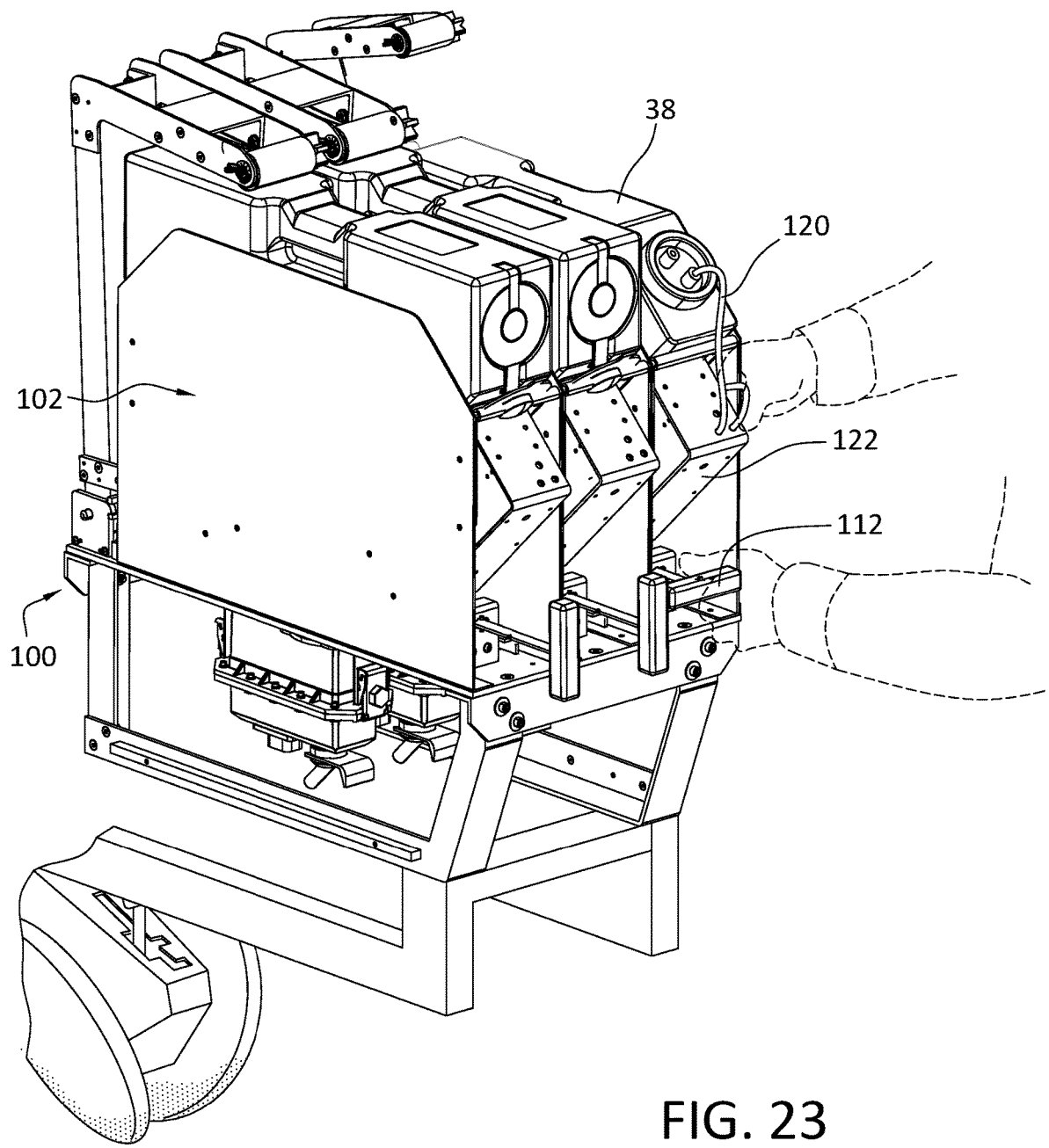
FIG. 23 shows a liquid container released in a similar manner as the dry container by rotating the handle element.

As shown in FIG. 23, a liquid container 38 is released in a similar manner as the dry container by rotating and actuating the handle element 112. However, the appropriate fluid conduits 120 are required to be connected. The fluid conduit connections are completed using leak-proof, quick-connect/disconnect union devices of a type that are similar in speed and operation to the quick-connect/disconnect union devices commonly found on pressurized air hoses that are used to add air to automobile tires. These conduits 120 connect the liquid container 38 to a liquid pump 122, as will be discussed below.

Figure 24:
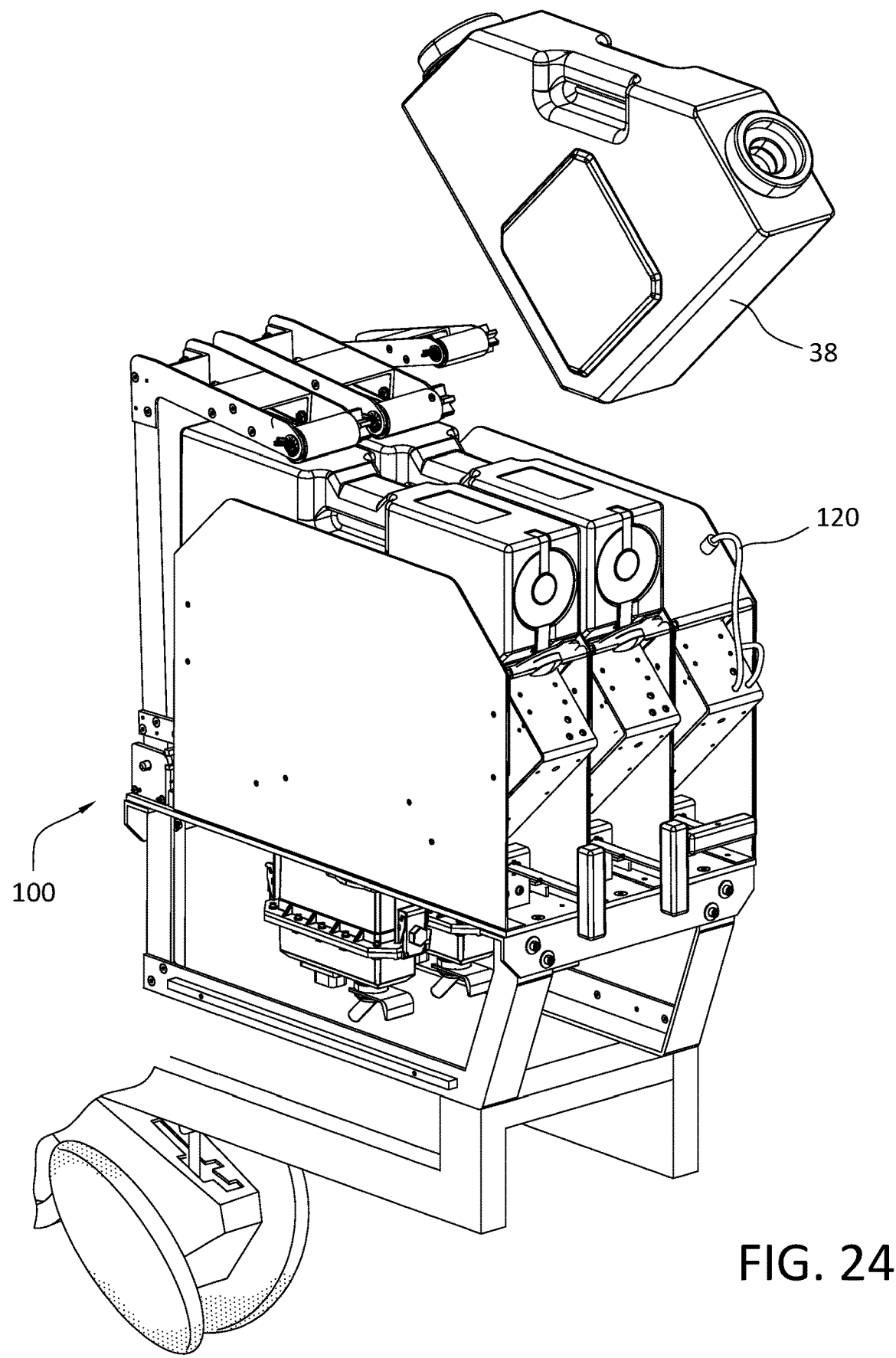
FIG. 24 shows a liquid container being removed.

FIG. 24 shows a liquid container 38 being removed. It can be swapped with either another liquid container or with a dry container.

Figure 25:
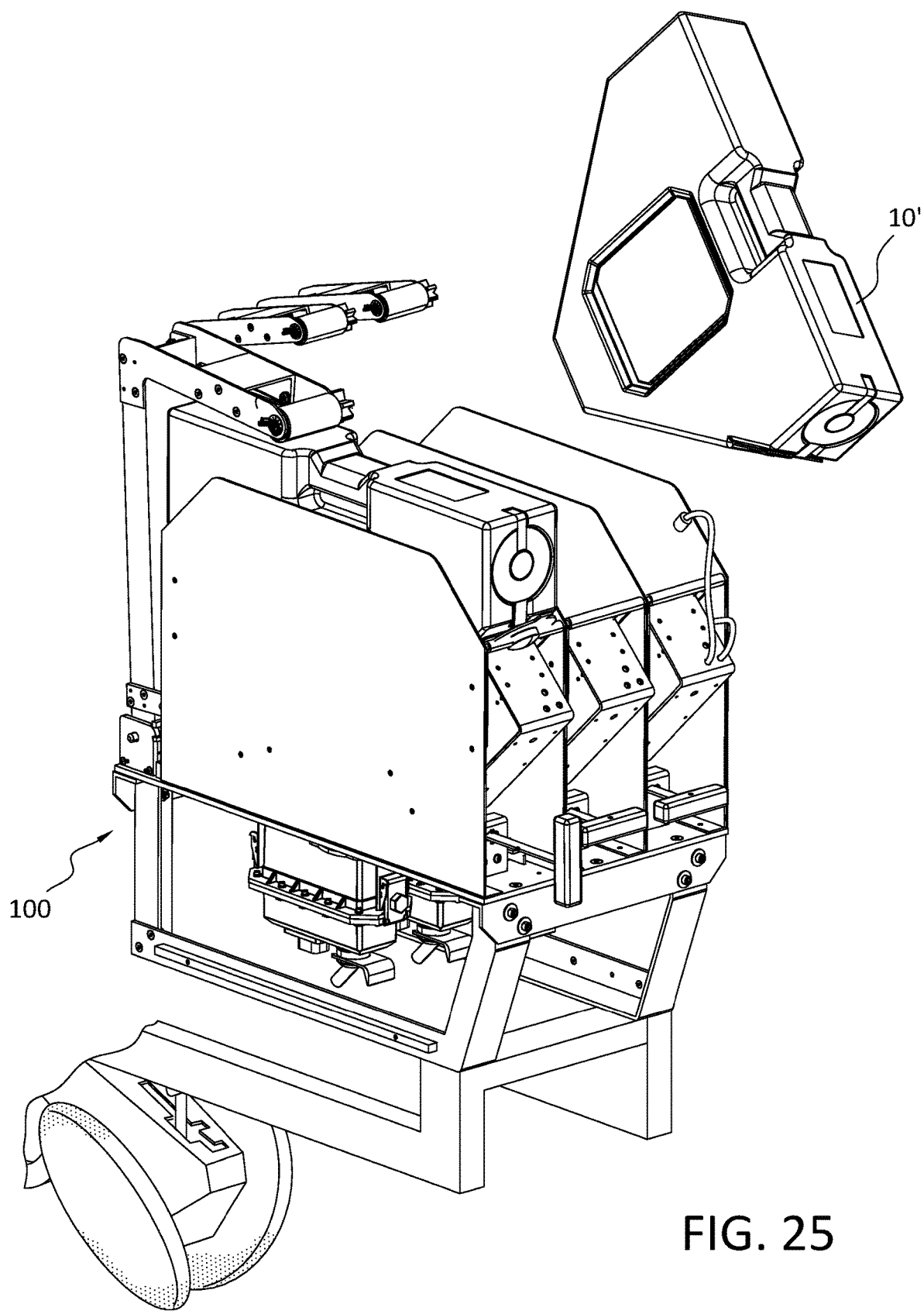
FIG. 25 shows a dry container being removed from the middle slot.

FIG. 25 shows a dry container 10' being removed from the middle slot.

Figure 26:
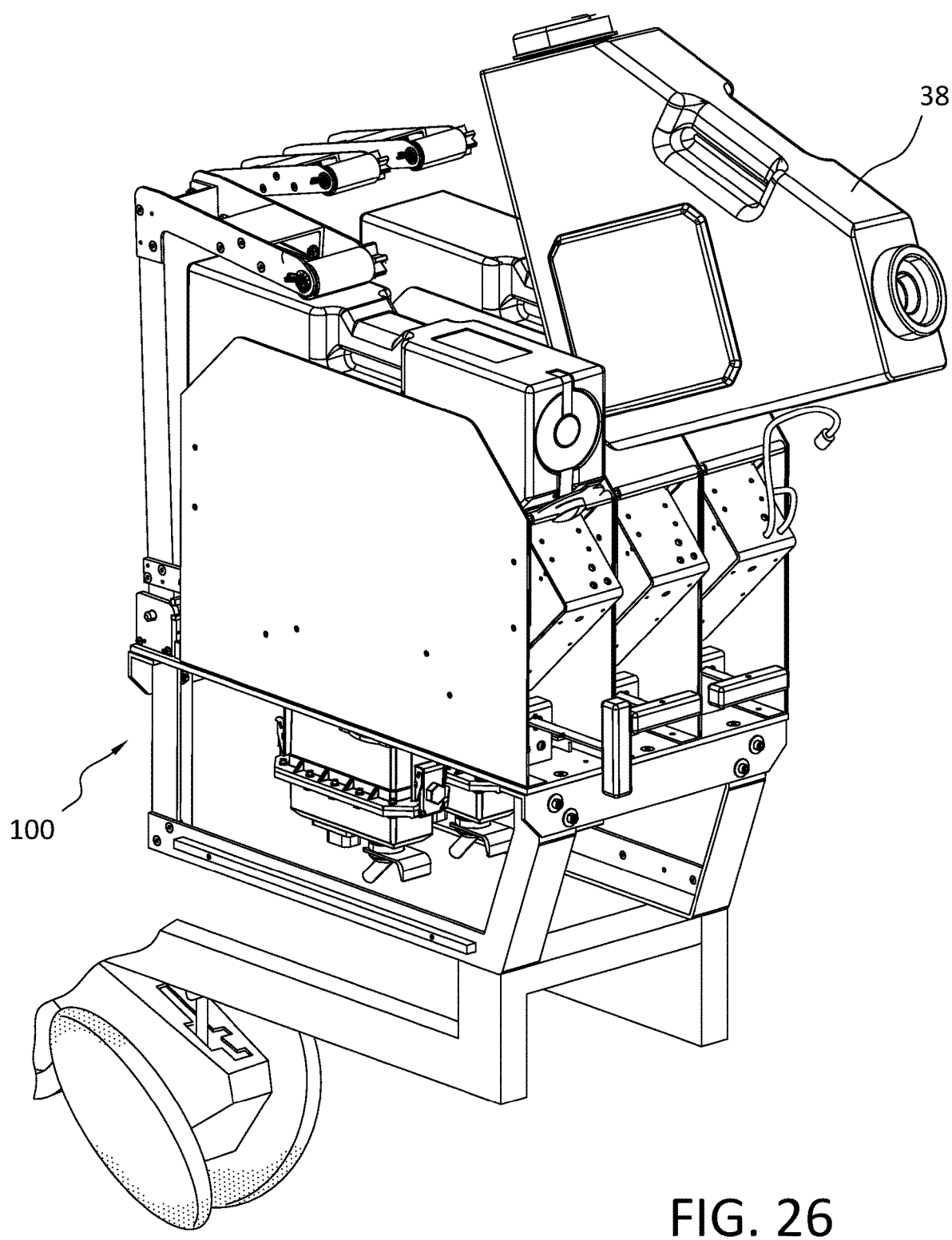
FIG. 26 shows the middle slot being used to support a liquid container.

In FIG. 26 that middle slot is shown being used to support a liquid container 38.

Figure 27:
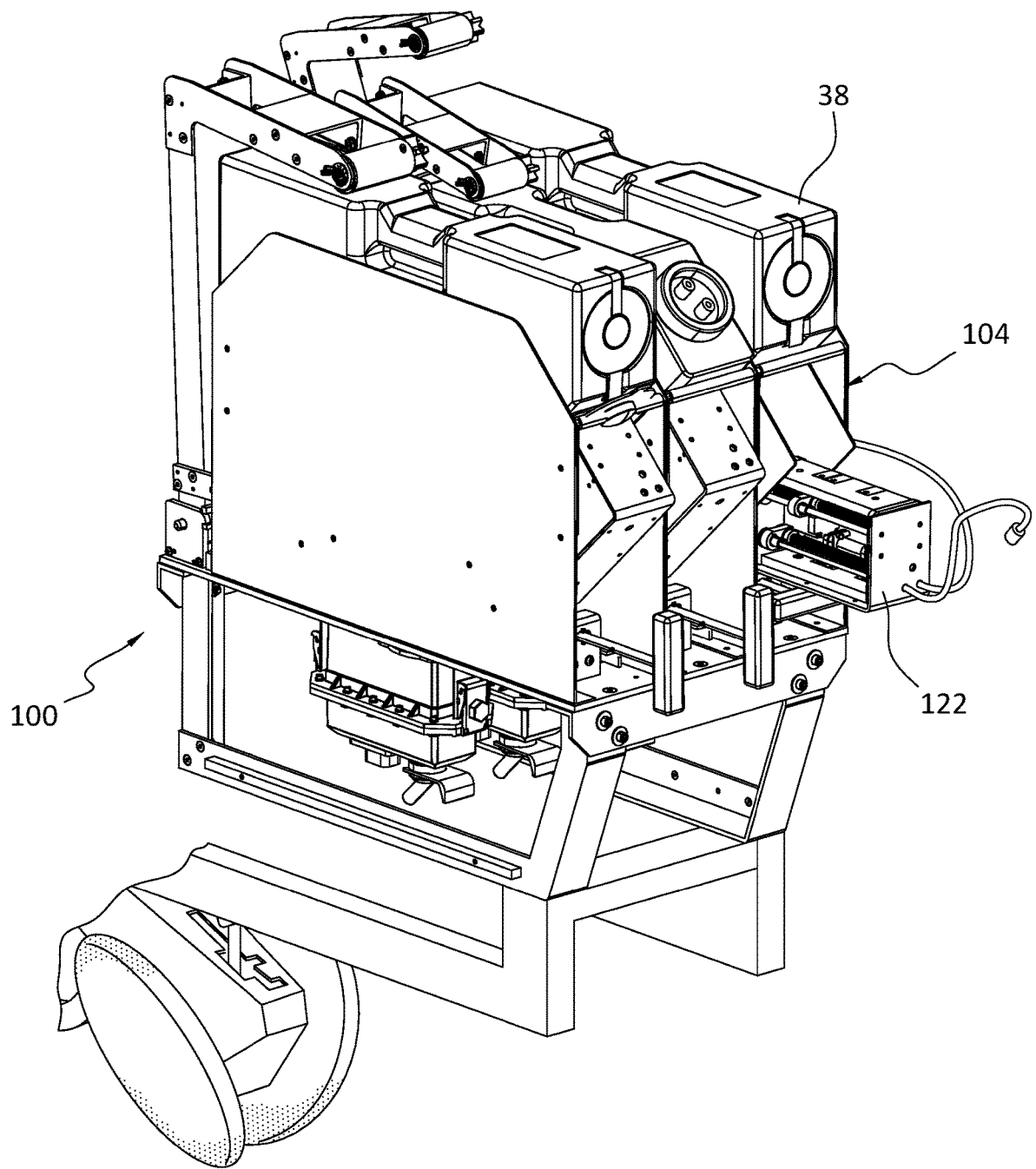
FIG. 27 shows a liquid pump being removed from the slot assembly of the housing assembly.

The slot assembly 104 includes the ability to hold liquid pumps 122 to support the operation of liquid containers 38. FIG. 27 shows a liquid pump 122 being removed from the slot assembly. A variety of different types of liquid pumps may be utilized. A syringe type pump is preferred. Such a syringe-type is disclosed in, for example, U.S. Publication No. US 2018/0359909 (U.S. patent application Ser. No. 16/112,660) incorporated by reference herein, in its entirety. Both the liquid pumps and dry meters may be attached/reattached by quick detach mechanisms.

Figure 28:
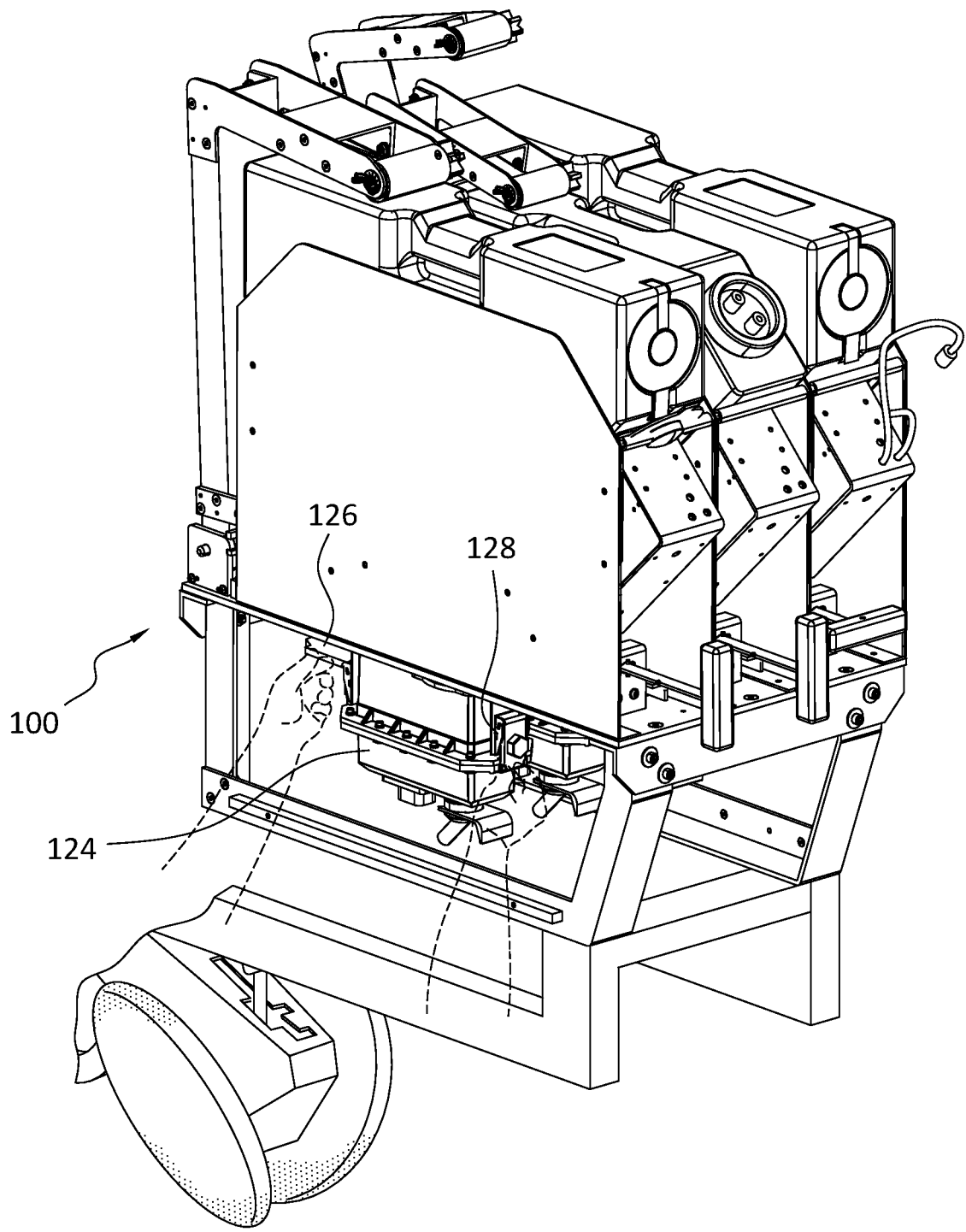
FIG. 28 shows detachment of a dry meter from the housing assembly, via a quick detach mechanism.

Referring to FIG. 28, a dry meter 124 is supported in the housing assembly 102 below the dry container 10. The dry meter 124 may be an electromechanical solenoid driven device for dry material. One type of metering device is described in U.S. Pat. No. 7,171,913, entitled "Self-Calibrating Meter With In-Meter Diffuser". Another type of metering device is described in U.S. Pat. No. 5,687,782, entitled "Transfer Valve For a Granular Materials Dispensing System". Another type of metering device is described in U.S. Pat. No. 5,524,794, entitled "Metering Device for Granular Materials". Another type of metering device for dry granular material is described in U.S. Pat. No. 5,156,372, entitled Metering Device for Granular Materials. Another type of metering device, is described in U.S. Publication No. US20170043961A1, entitled Brush Auger Meter, which describes a device for metering granular or powdered product, having a meter housing, an auger housing positioned within the meter housing, the auger housing having an inlet opening for receiving the granular or powdered product, a rotatable spiral brush mounted within the auger housing, a first discharge outlet near one end of the auger housing for discharging granular or powdered product, and another opening near another end of the auger housing for discharging granular or powdered product not discharged through the first discharge opening. U.S. Pat. Nos. 7,171,913; 5,687,782; 5,524,794; 5,156,372 and, U.S. Publication No. US20170043961A1 are incorporated herein by reference in their entireties. FIG. 28 shows detachment of a dry meter 124 from the housing assembly, via a quick detach mechanism. The left hand has lifted the left latch 126 and the right hand has grasped the right latch 128 but not opened it yet.

Figure 29:
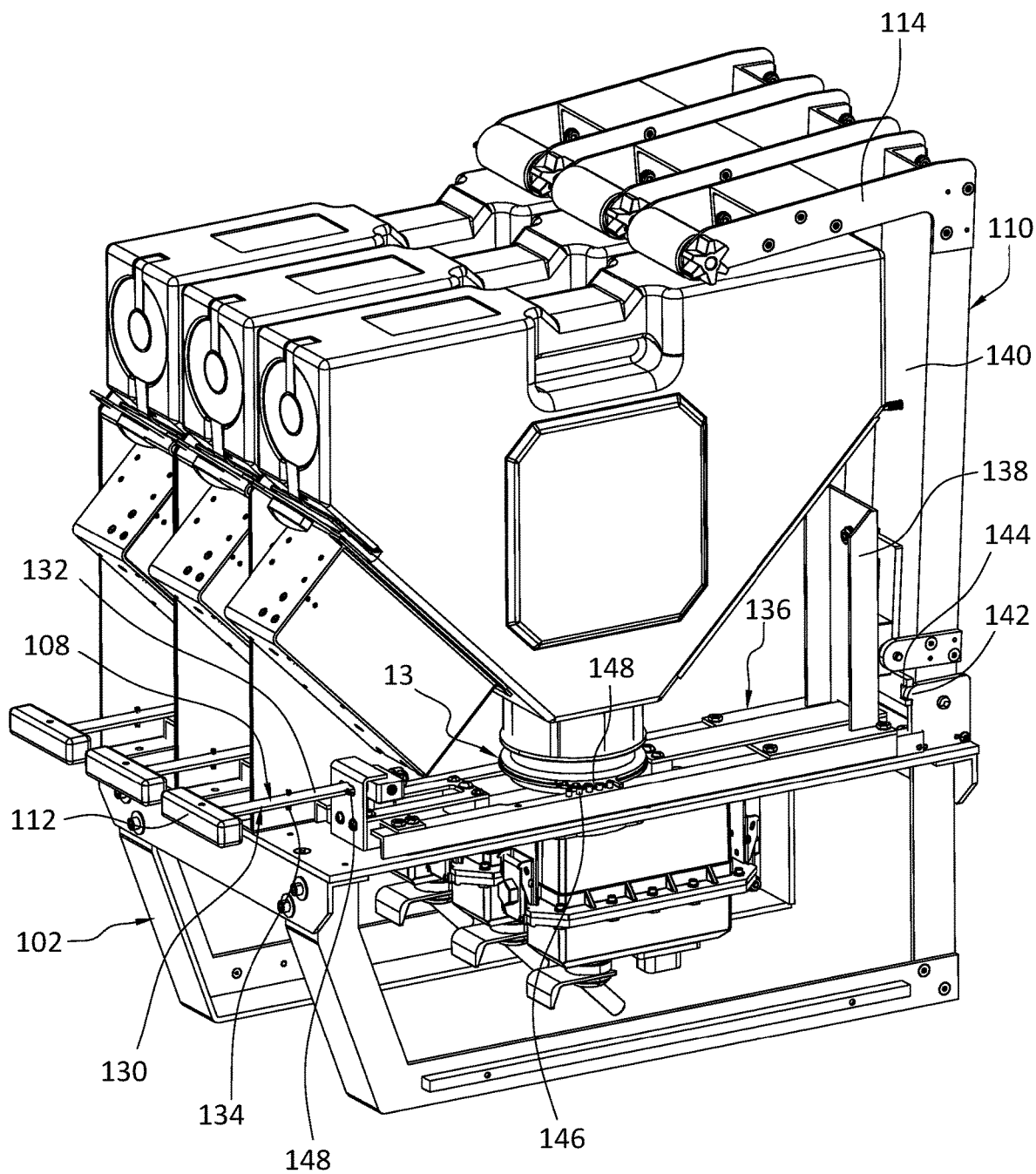
FIG. 29 is a perspective illustration of the container system with the end walls of the housing assembly being shown removed to show details of the push assembly.

Referring now to FIG. 29 a container system is illustrated with the end walls of the housing assembly 102 removed to show the housing assembly 102 in greater detail than the previous figures. Each push assembly 108 includes a handle assembly 130 engageable by a user via the handle element 112. The handle assembly 130 includes the handle element 112, a handle shaft 132, and handle assembly pins 134.

Each push assembly 108 also includes a rail assembly 136 operably connected to the handle assembly 130 having a vertical element 138 for pushing against a vertical portion 140 of an associated lock arm assembly 110 enabling rotation thereof for disengagement of a container.

The rail assembly 136 includes a tab 142 at an end thereof which releases the associated lock arm assembly 110 enabling the rotation thereof. The lock arm assembly 110 includes a slot 144 for detaching the lock arm assembly 110 from the push assembly 108 thus allowing the lock arm assembly 110 to rotate away from the abutting container when the handle assembly 130 is pushed in.

Each rail assembly 136 includes rail assembly pins 146 for engagement with the discharge valve assembly 13 attachable to a container to control discharge of agricultural products. A sprocket 148 of the discharge valve assembly engages the rail assembly pins 146 to open a discharge valve of the discharge valve assembly 13 when a container has been secured. When the container is detached the push assembly 108 also automatically closes the discharge valve. Thus, in this preferred embodiment each push assembly and operably connectable lock arm assembly collectively define a container lock assembly mechanism which is operably connectable to a discharge valve assembly attachable to a container by this "key" engagement therebetween.

The push assembly 108, when engaged to release a container, simultaneously 1) pushes the tab 142 away from the lock arm assembly 110; 2) lifts the hold down arm 114 of the lock arm assembly 110, providing rotation of the lock arm assembly 110; and, 3) closes the discharge valve of the discharge valve assembly 13.

The handle assembly pins 134 engage a slot 148 on the rail assembly 136 to provide axial movement of the handle shaft beyond a stop point. Complete actuation of the handle assembly 130 requires further rotations of the handle 112 to provide alignment of the handle assembly pins 134 with the slot 148 on the rail assembly 136. This is provided for safety purposes.

In summary, the agricultural containers include the following features:

Trapezoid shape—With the dry containers the sloped sides allow a sufficiently steep angle of repose that allows granules to gravity-flow out the discharge outlet in the bottom of the container. The similarly shaped liquid container can be used in the common container housing assembly on a planter row unit, as discussed above.

The recessed area in the top of the container serves as a handle that's built-in/integral to the container as the container is being manufactured during, for example, a rotational molding process. The handle facilitates installation and removal of filled containers.

The opening on one side of the dry container serves as the access point by which agricultural product is introduced into the container during the filling/refilling process. A protective, tamper-evident cap is provided to prevent moisture and/or anything other than the intended and authorized crop input product from an authorized refiller from entering the dry cartridge and to provide evidence if the seal for this area has been broken. If the seal has been broken, the dry cartridge is not generally eligible for refilling unless and until it's been emptied, washed, and re-certified as clean and eligible for use.

Both dry and liquid cartridges preferably include a raised panel on one face and a recessed panel on the opposite face. This facilitates shipment of the containers, as the raised panel from one container resides within or "nests" with the recessed area of a container that's stacked adjacent to it. The nesting feature minimizes movement of the containers when stacked.

The discharge port on the bottom of the dry container is the point from which product flows during application. In one embodiment, a rotating discharge valve may be manufactured separately from the container. The valve can be installed as part of an operational "cartridge" each and every time. The valve will work in combination with the hardware/software on the operating equipment.

The discharge port of the liquid container does not have a rotating valve; and, the discharge port of the liquid container is positioned in a different location from the discharge port of a dry container. The different position is to prevent leakage from a liquid container into the dry application meter that resides directly below the discharge port of a dry container; 3) liquid product is sucked out of the container via a dip-tube positioned in the container. The dip tube may be manufactured separately and installed in each liquid container in a manner that is similar to how a rotating valve is installed in each dry container. Each dip tube is preferably equipped with a fitting/apparatus that allows a quick-connect/disconnect device to be attached to another fitting that, when attached, allows the liquid contents of the container to be pumped-out/withdrawn from the container. In some embodiments, one or more pressure relief valves that enable equalization of the internal cartridge air pressure with the atmospheric pressure outside the container can be included.

The agricultural products may be nematicides or insecticides, or a wide variety of other crop enhancement agricultural products such as fungicides, plant growth regulators (PGRs), micro-nutrients, etc.

The container system herein is particularly useful with low-rate agricultural products. As used herein the term "low-rate" or "low rate" as it applies to liquids refers to a rate defined as below 3.7 fluid ounces per 1000 row feet. When utilized with a syringe pump ultra-low-rates are achievable, i.e. below 0.9 fluid ounces per 1000 row feet. As it applies to dry, flowable agricultural products the term "low-rate" or "low rate" refers to a rate below 3 ounces per 1000 row feet.

U.S. patent application Ser. No. 16/112,660, filed Aug. 25, 2018, entitled SYSTEM AND METHOD FOR DISPENSING MULTIPLE LOW RATE AGRICULTURAL PRODUCTS, discussed above discloses various systems and methods for applying agricultural products as well as dry meters and liquid pumps for these systems.

Figure 30:
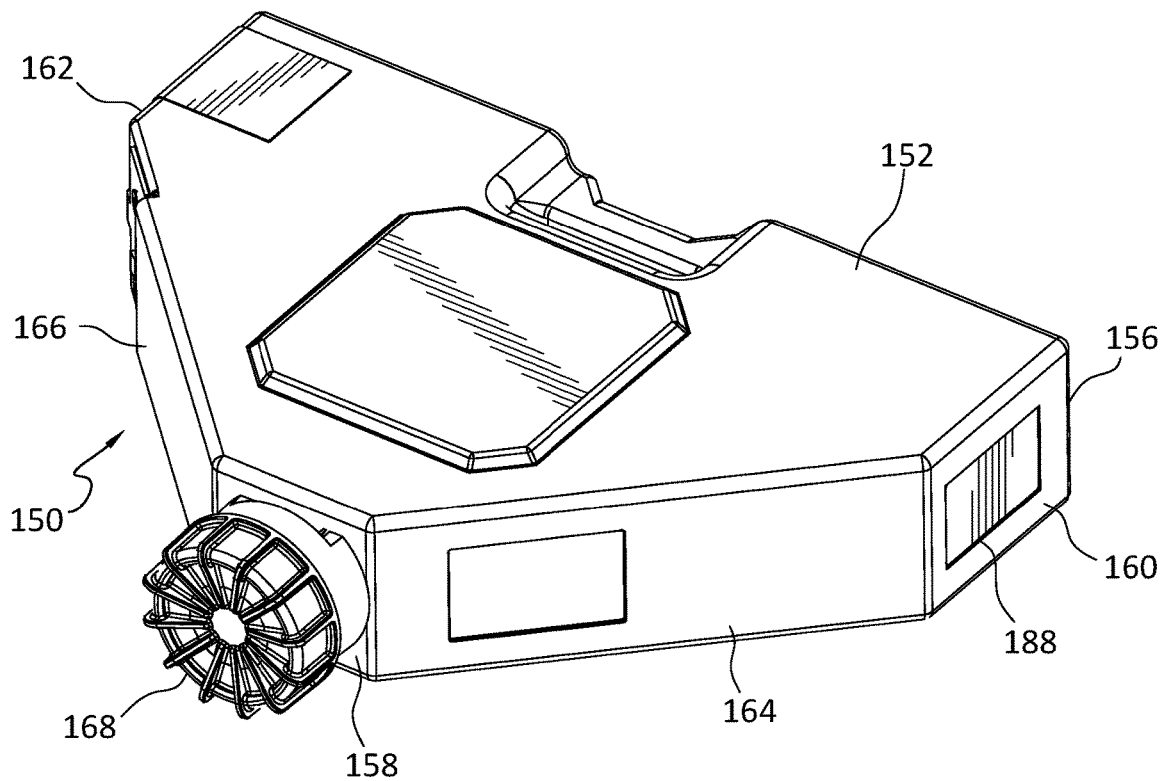
FIG. 30 is a top perspective view of a second embodiment of a dry agricultural product container utilized in the present system for stacking containers.
Figure 31:
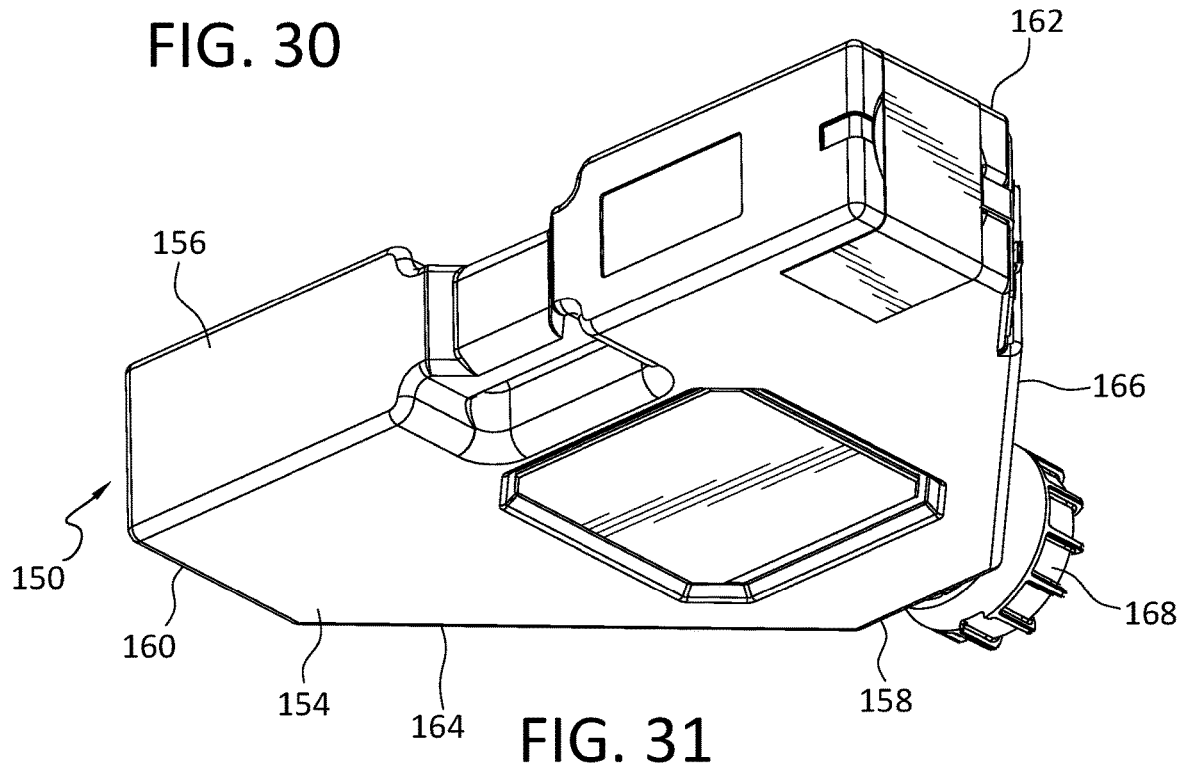
FIG. 31 is a bottom perspective view of the dry agricultural product container of FIG. 30.

Referring now to FIGS. 30-31, an alternate embodiment of a dry agricultural product container is illustrated, generally designated as 150. In this embodiment the position of the RFID tag has been changed from that in the embodiment shown in FIGS. 1-8. Otherwise, the geometry of the dry agricultural product containers remains the same. Each dry agricultural product container 150 includes a front face 152 having a truncated trapezoidal shape. The rear face 154 also has a truncated trapezoidal shape. Each dry container 150 includes a top base 156, a bottom base 158, a first vertical side 160, a second vertical side 162, a first sloped side 164, a second sloped side 166, and a discharge valve 168. The first vertical side 160 is adjacent to the top base 156. The second vertical side 162 is also adjacent to the top base 156. The first sloped side 164 is positioned between the first vertical side 160 and the bottom base 158. The second sloped side 166 is positioned between the second vertical side 162 and the bottom base 158. The front face 152, rear face 154, top base 156, bottom base 158, first vertical side 160, and second vertical side 162 are configured to define an enclosure.

In this embodiment, the first vertical side 160 defines a platform supporting an RFID tag 188. In this embodiment, as discussed below, the dry containers are particularly adaptable to being stacked for use on a pallet.

Figure 32:
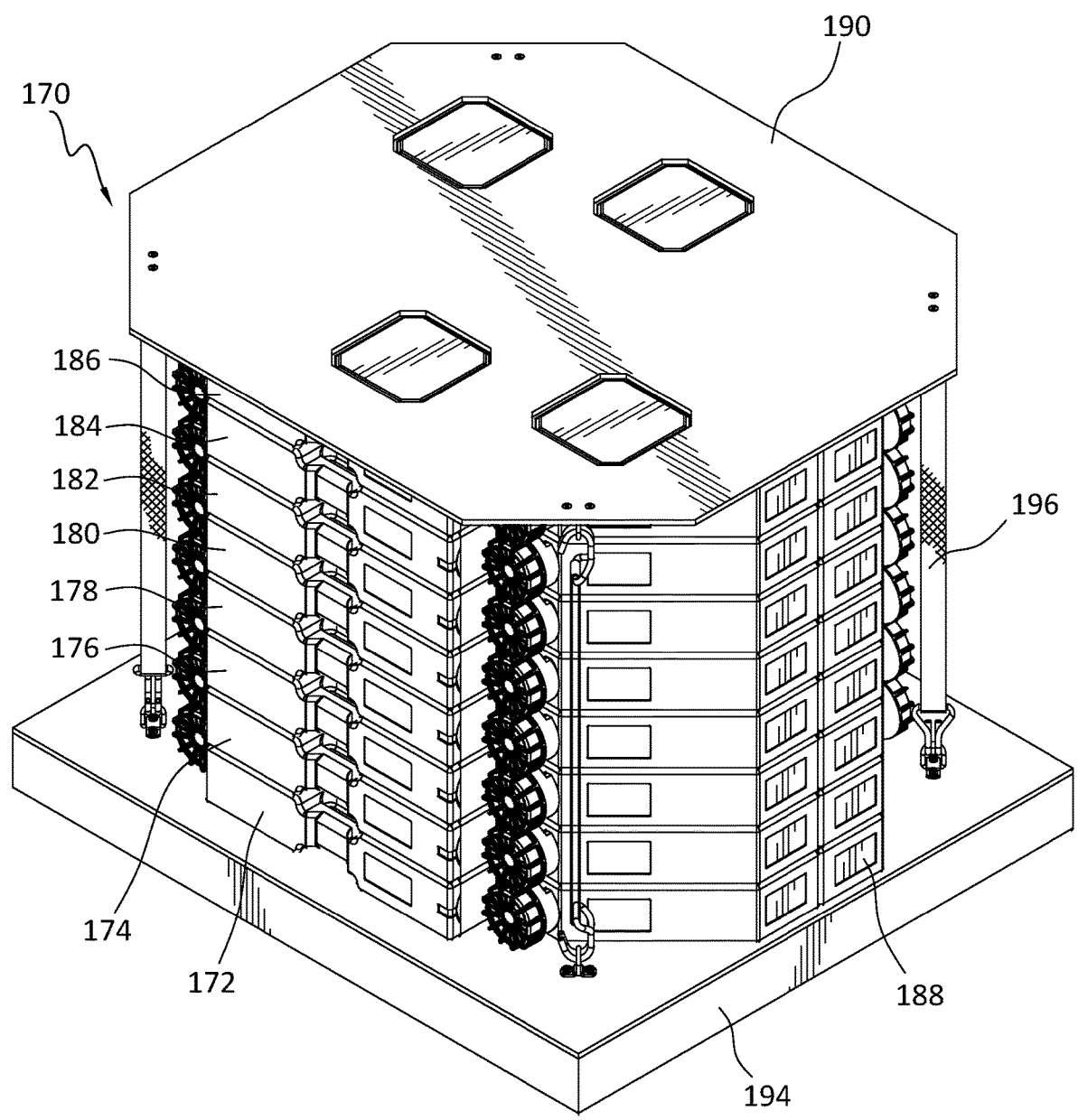
FIG. 32 is a perspective illustration of the system for stacking containers of the present invention.
Figure 33:
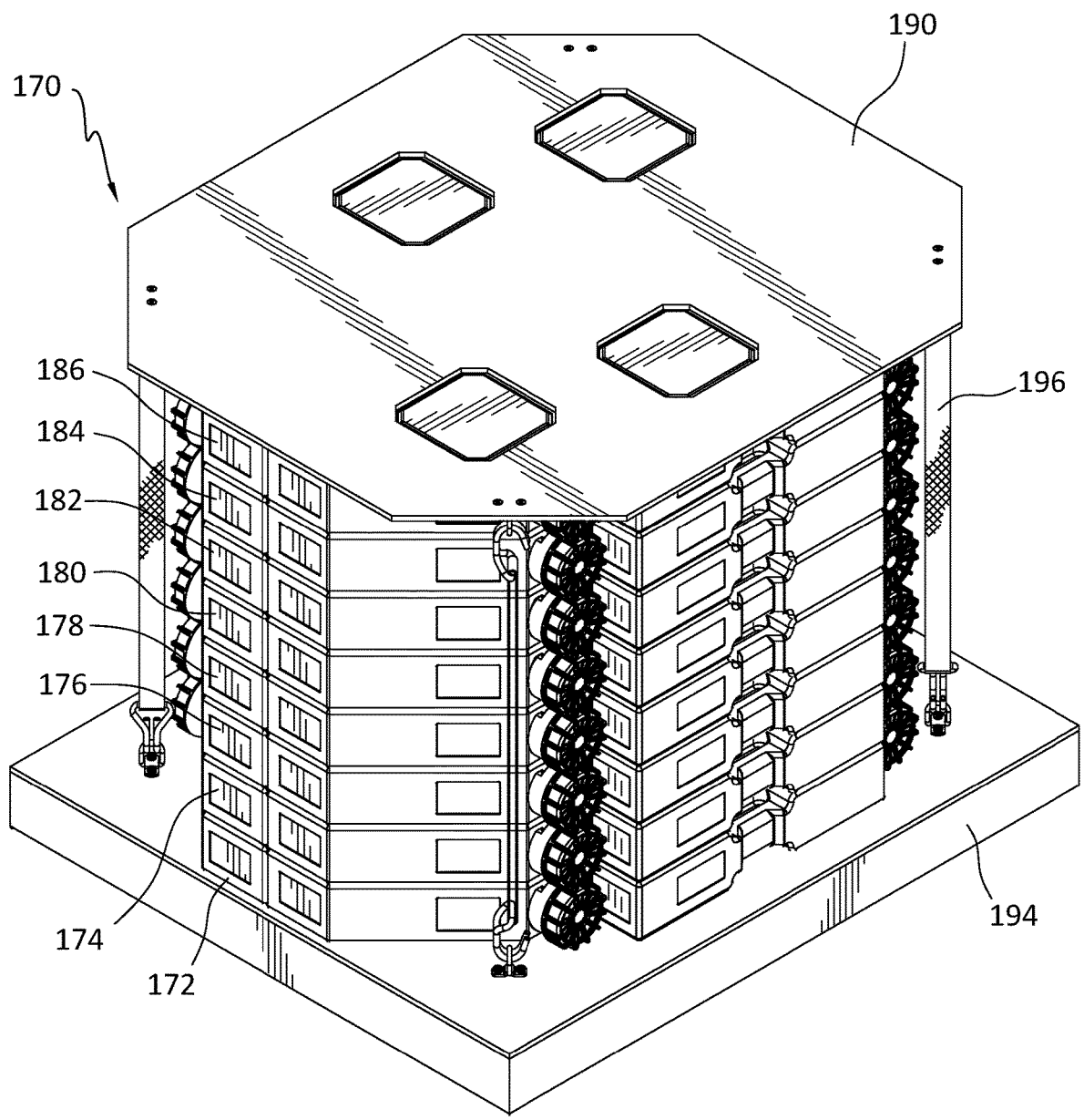
FIG. 33 is a perspective view of the system of FIG. 32 shown from the opposite side.

FIGS. 32-36 illustrate a system 170 for stacking these dry agricultural product containers. FIGS. 32 and 33 show the complete system for stacking of containers 170. In the system 170 shown, there are eight layers of containers: a first layer 172, a second layer 174, a third layer 176, a fourth layer 178, a fifth layer 180, a sixth layer 182, a seventh layer 184, and an eighth layer 186. The first layer 172 and the additional layers of stacked layers are positioned between a top pallet plate 190 and a bottom pallet plate 192. The bottom pallet plate 192 is positioned on a pallet element 194. The bottom pallet plate 192 is secured to the top pallet plate 190 by an elastic cord 196.

Figure 34:
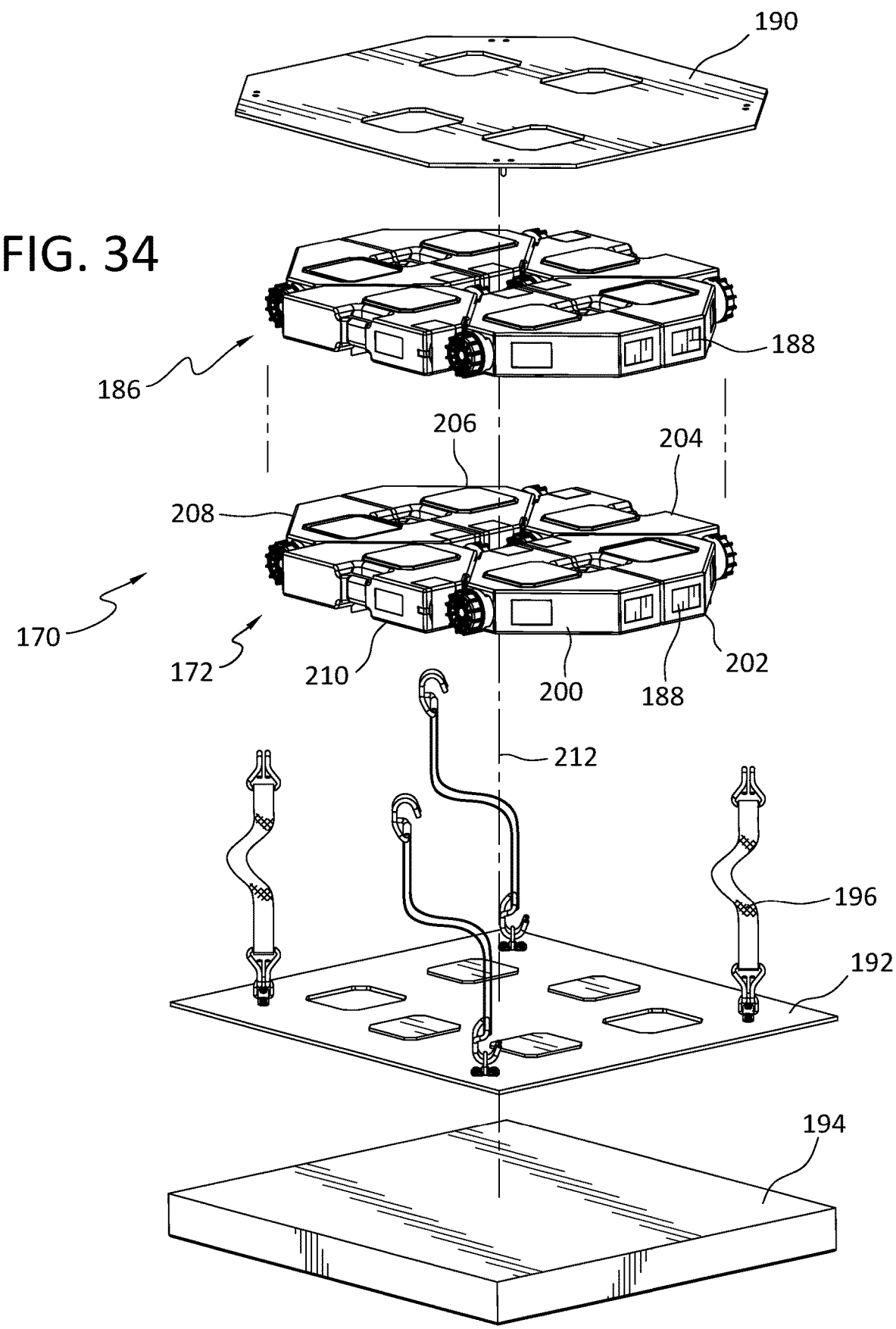
FIG. 34 is an exploded perspective illustration of the system of FIG. 32 showing two of the eight levels of containers.
Figure 35:
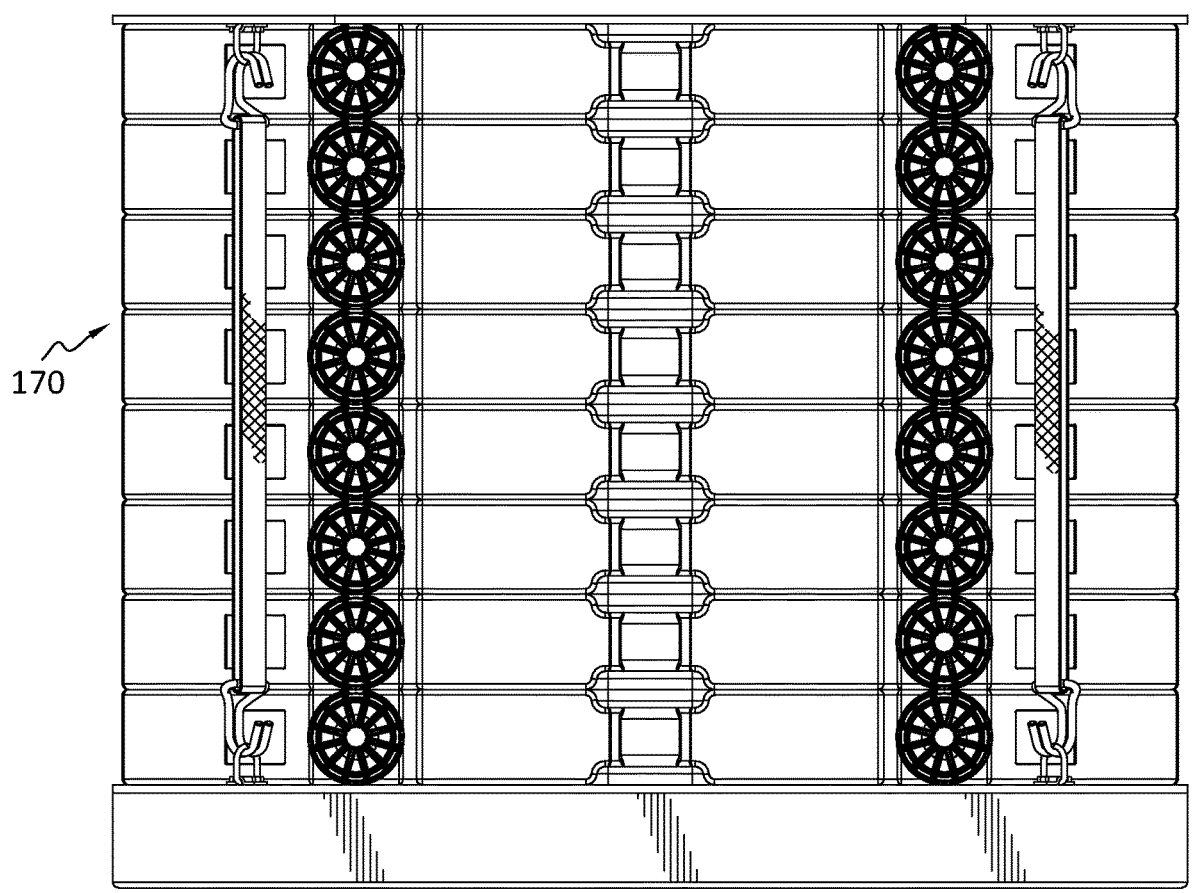
FIG. 35 is a front view of the system for stacking containers of FIG. 32.
Figure 36:
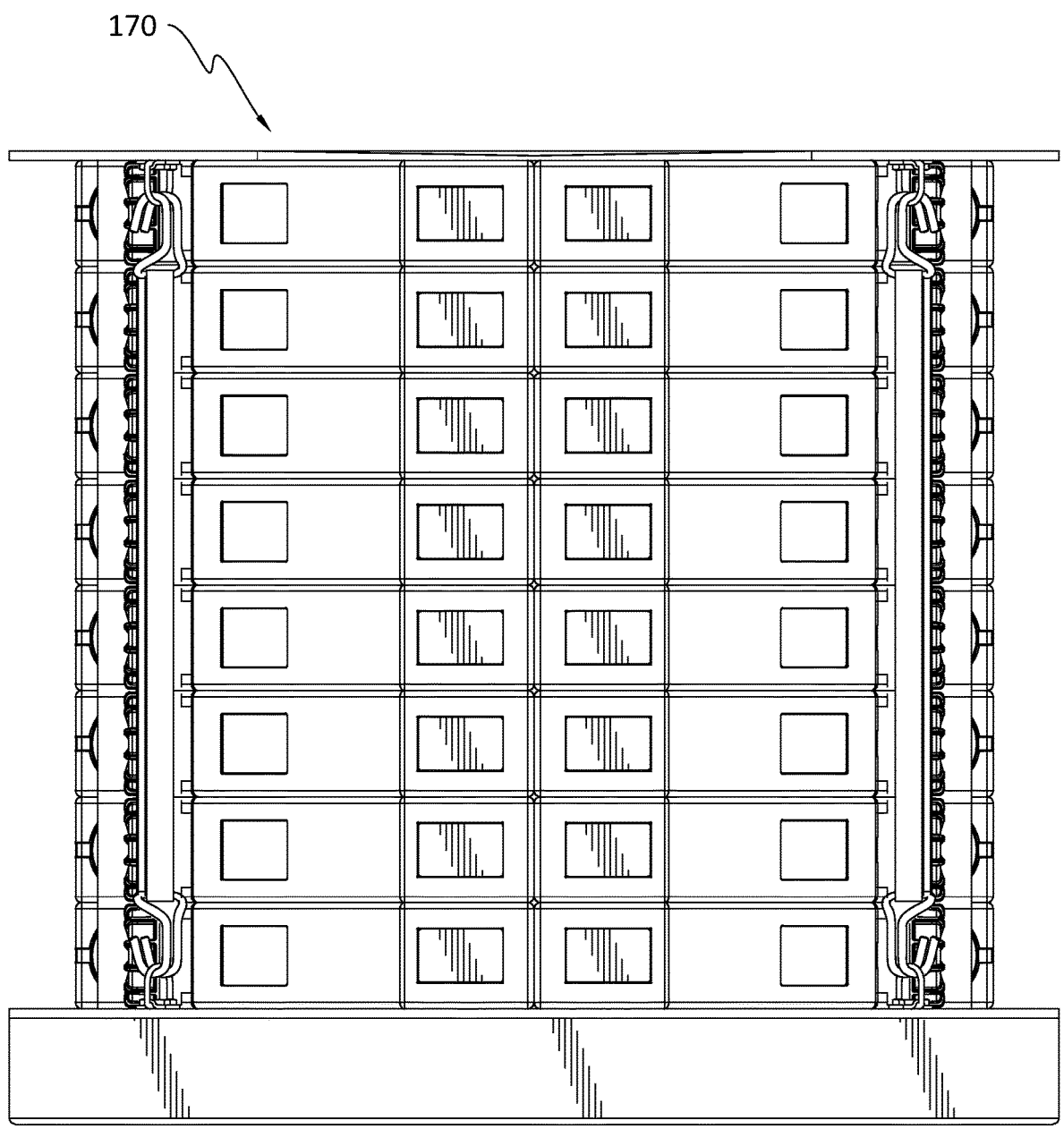
FIG. 36 is a side view of the system for stacking containers of FIG. 32.

FIG. 34 shows the system for the stacking of containers 170 in an exploded view showing only the first layer 172 and eighth layer 186 for the purposes of clarity. Each layer includes six containers: a first container 200, a second container 202, a third container 204, a fourth container 206, a fifth container 208, and a sixth container 210. The second container 202 is positioned adjacent to the first container 200 so that their respective top bases 156 abut each other. The third container 204 is positioned adjacent to the second container 202 so that its second sloped side 166 abuts the second sloped side 166 of the second container 202. The fourth container 206 is positioned adjacent to the third container 204 so that its first sloped side 164 abuts the first sloped side 164 of the third container 204. The fifth container 208 is positioned adjacent to the fourth container 206 so that their respective top bases 156 abut. The sixth container 210 is positioned adjacent to the fifth container 208 so that its second sloped side 166 abuts a second sloped side 166 of the fifth container 208. The first sloped side 164 of the sixth container 210 abuts a second sloped side 166 of the first container 200. The first container 200, the second container 202, the third container 204, the fourth container 206, the fifth container 208 and sixth container 210 are positioned about a central axis 212.

The additional layers of containers are stacked along the central axis 212, and are positioned in the same manner as the first layer 172 of containers. The first vertical side 160 of each container supports an RFID tag 188 which is external for providing efficient, line of sight reading of the RFID tags on the platforms. Such positioning of the RFID tags on containers stacked in such an arrangement facilitates simultaneous reading of all of the tags on an individual pallet, and it also facilitates simultaneous reading of all the tags on multiple pallets, when said pallets are present together as might occur in a warehouse, shipping container, delivery truck, rail car, or means of transport.

As mentioned above, other embodiments and configurations may be devised without departing from the spirit of the invention and the scope of the appended claims.

The invention claimed is:

1. A method for stacking a plurality of containers, comprising:
   a) providing a plurality of containers, each container, comprising:
      a front face having a truncated trapezoidal shape;
      a rear face having a truncated trapezoidal shape;
      a top base;
      a bottom base;
      a first vertical side adjacent to said top base;
      a second vertical side adjacent to said top base;
      a first sloped side between said first vertical side and said bottom base;
      a second sloped side between said second vertical side and said bottom base;
   wherein said front face, rear face, top base, bottom base, first vertical side, and second vertical side are configured to define an enclosure;

a discharge valve projecting from said bottom base; and, wherein said first vertical side defines a platform for supporting an RFID tag;

b) arranging a first layer of containers, comprising:
a first container;
a second container positioned adjacent to said first container so that their respective top bases abut;
a third container positioned adjacent to said second container so that its second sloped side abuts a second sloped side of the second container;
a fourth container positioned adjacent to said third container so that its first sloped side abuts a first sloped side of the third container;
a fifth container positioned adjacent to said fourth container so that their respective top bases abut;
a sixth container positioned adjacent to said fifth container so that its second sloped side abuts a second sloped side of the fifth container and a first sloped side of the sixth container abuts a second sloped side of said first container;
wherein said first container, said second container, said third container, said fourth container, said fifth container and said sixth container are positioned about a central axis;

c) stacking additional layers of containers along said central axis, said additional layers being configured the same as said first layer of containers, wherein said first vertical side defining a platform for supporting an RFID tag is external for providing simultaneous reading of multiple RFID tags on the platforms.

2. The method of claim 1 wherein each container of said plurality of containers includes a raised panel on either said front face or said rear face, and a recessed panel on an opposite face for providing nesting when the containers are stacked.

3. The method of claim 1 wherein each container of said plurality of containers is configured to contain dry agricultural product.

4. The method of claim 1 wherein said first layer and additional layers of stacked layers are positioned between a top pallet plate and a bottom pallet plate, and wherein said bottom pallet plate is positioned on a pallet element.

5. The method of claim 1 wherein said first layer and additional layers of stacked layers are positioned between a top pallet plate and a bottom pallet plate, and wherein said bottom pallet plate is positioned on a pallet element; and,
wherein the bottom pallet plate is secured to the top pallet plate by an elastic cord.

6. A system for stacking a plurality of containers, comprising:
a) a plurality of containers, each container, comprising:
a front face having a truncated trapezoidal shape;
a rear face having a truncated trapezoidal shape;
a top base;
a bottom base;
a first vertical side adjacent to said top base;
a second vertical side adjacent to said top base;
a first sloped side between said first vertical side and said bottom base;
a second sloped side between said second vertical side and said bottom base;
wherein said front face, rear face, top base, bottom base, first vertical side, and second vertical side are configured to define an enclosure;
a discharge valve projecting from said bottom base; and,
wherein said first vertical side defines a platform for supporting an RFID tag;
b) wherein said plurality of containers defines a first layer of said plurality of containers,
said first layer comprising:
a first container;
a second container positioned adjacent to said first container so that their respective top bases abut;
a third container positioned adjacent to said second container so that its second sloped side abuts a second sloped side of the second container;
a fourth container positioned adjacent to said third container so that its first sloped side abuts a first sloped side of the third container;
a fifth container positioned adjacent to said fourth container so that their respective top bases abut;
a sixth container positioned adjacent to said fifth container so that its second sloped side abuts a second sloped side of the fifth container and a first sloped side of the sixth container abuts a second sloped side of said first container;
wherein said first container, said second container, said third container, said fourth container, said fifth container and said sixth container are positioned about a central axis;
c) additional layers of containers being stacked along said central axis, said additional layers being configured the same as said first layers of containers, wherein said first vertical side defining a platform for supporting an RFID tag is external for providing simultaneous reading of multiple RFID tags on the platforms.

* * * * *